United States Patent
Dobraunig et al.

(10) Patent No.: US 12,086,596 B2
(45) Date of Patent: Sep. 10, 2024

(54) INSTRUCTIONS FOR ACCELERATING KECCAK EXECUTION IN A PROCESSOR

(71) Applicant: Intel Corporation, Santa Clara, CA (US)

(72) Inventors: Christoph Dobraunig, St. Veit an der Glan (AT); Santosh Ghosh, Hillsboro, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 18/164,738

(22) Filed: Feb. 6, 2023

(65) Prior Publication Data

US 2024/0264837 A1    Aug. 8, 2024

(51) Int. Cl.
G06F 9/30 (2018.01)
(52) U.S. Cl.
CPC ...... *G06F 9/30196* (2013.01); *G06F 9/30029* (2013.01); *G06F 9/30032* (2013.01)
(58) Field of Classification Search
CPC .............. G06F 9/30196; G06F 9/30029; G06F 9/30032
USPC ........................................................ 712/208
See application file for complete search history.

(56) References Cited

U.S. PATENT DOCUMENTS

| | | | |
|---|---|---|---|
| 9,747,105 B2* | 8/2017 | Gopal | G06F 9/3001 |
| 11,152,052 B1* | 10/2021 | Morishita | G11C 16/20 |
| 2013/0275722 A1 | 10/2013 | Yap et al. | |
| 2020/0117811 A1* | 4/2020 | Ghosh | G09C 1/00 |
| 2022/0066741 A1 | 3/2022 | Saarinen | |
| 2023/0067896 A1* | 3/2023 | Huang | H04L 9/0618 |
| 2024/0061961 A1* | 2/2024 | Kumar | H04L 9/3239 |

OTHER PUBLICATIONS

Announcing the Advanced Encryption Standard (AES, (2001) Federal Information Processing Standards Publication 197, 51 pages.
"SHA-3 Standard: Permutation-Based Hash and Extendable Output Functions", Federal Information Processing Standards Publication, Aug. 2015, Information Technology Laboratory, National Institute of Standards and Technology, Gaithersburg, MD 20899-8900, 37 pages.
European Search Report and Search Opinion, EP App. No. 23207698.4, Mar. 28, 2024, 9 pages.
Rawat, H. K., et al., "SIMD Instruction Set Extensions for Keccak with Applications to SHA-3, Keyak and Ketje", HASP '16: Proceedings of the Hardware and Architectural Support for Security and Privacy, Article No. 4, Jun. 2016, pp. 1-8.

* cited by examiner

*Primary Examiner* — Chun Kuan Lee
(74) *Attorney, Agent, or Firm* — NICHOLSON DE VOS WEBSTER & ELLIOTT LLP

(57) ABSTRACT

Techniques are described for an instruction for a conditional rotate and XOR operation in a single instruction and triple input bitwise logical operations in a single instruction in an instruction set of a computing system.

14 Claims, 21 Drawing Sheets

FETCH A SINGLE CONDITIONAL ROTATE AND XOR INSTRUCTION OF A FIRST INSTRUCTION SET ARCHITECTURE HAVING FIELDS FOR AN OPCODE, FIRST OPERAND, SECOND OPERAND, THIRD OPERAND, AND FOURTH OPERAND 601

TRANSLATE THE FETCHED SINGLE CONDITIOAL ROTATE AND XOR INSTRUCTION OF THE FIRST INSTRUCTION SET ARCHITECTURE INTO ONE OR MORE INSTRUCTIONS OF A SECOND INSTRUCTION SET ARCHITECTURE 602

DECODE THE ONE OR MORE INSTRUCTIONS SECOND INSTRUCTION SET ARCHITECTURE 603

RETRIEVE DATA ASSOCIATED WITH THE OPERANDS AND SCHEDULE 605

EXECUTE THE DECODED ONE OR MORE INSTRUCTIONS OF THE SECOND INSTRUCTION SET ARCHITECTURE TO:

Left rotate the third operand by the first rotation value to generate a first result, execute the first operand XOR the second operand XOR the first result to generate a second result, left rotate the second result by the second rotation value to generate a third result, and store the third result in the first operand.
607

COMMIT A RESULT OF THE EXECUTED INSTRUCTION(S) 609

FIG. 6

```
┌─────────────────────────────────────────────────────────────────────┐
│ FETCH TRIPLE INPUT BITWISE LOGIC OPERATIONS INSTRUCTION HAVING      │
│ FIELDS FOR AN OPCODE, FIRST OPERAND, SECOND OPERAND, AND THIRD      │
│ OPERAND 901                                                         │
└─────────────────────────────────────────────────────────────────────┘
                                    ↓
┌─────────────────────────────────────────────────────────────────────┐
│ DECODE THE TRIPLE INPUT BITWISE LOGIC OPERATIONS INSTRUCTION 903    │
└─────────────────────────────────────────────────────────────────────┘
                                    ↓
┌─────────────────────────────────────────────────────────────────────┐
│ RETRIEVE DATA ASSOCIATED WITH THE OPERANDS AND SCHEDULE 905         │
└─────────────────────────────────────────────────────────────────────┘
                                    ↓
┌─────────────────────────────────────────────────────────────────────┐
│ EXECUTE THE DECODED INSTRUCTION TO:                                 │
│                                                                     │
│ execute an "AND" operation on the second operand and the third      │
│ operand to generate a first result, execute the first operand XOR   │
│ the first result to generate a second result, execute the second    │
│ result XOR the third operand to generate a third result, and store  │
│ the third result in the first operand.                              │
│                                                                     │
│ 807                                                                 │
└─────────────────────────────────────────────────────────────────────┘
                                    ↓
┌─────────────────────────────────────────────────────────────────────┐
│ COMMIT A RESULT OF THE EXECUTED INSTRUCTION                         │
│ 909                                                                 │
└─────────────────────────────────────────────────────────────────────┘
```

FIG. 9

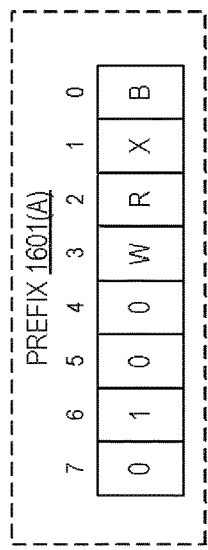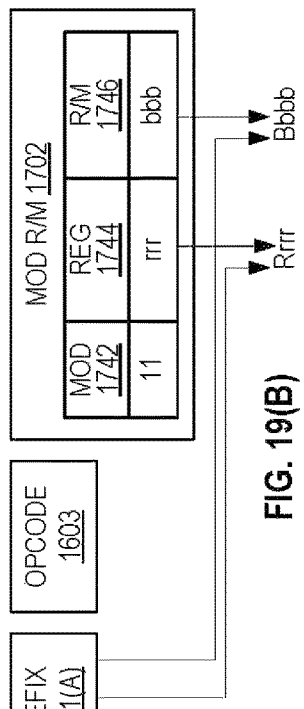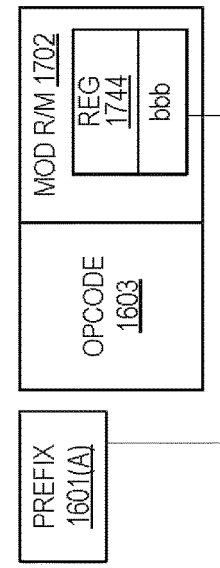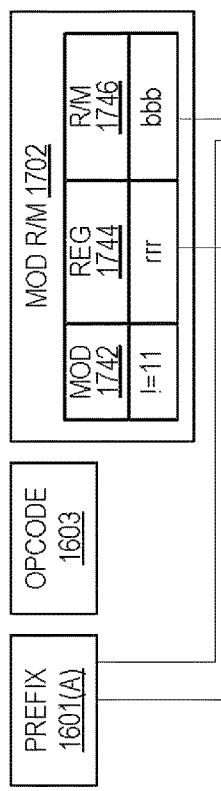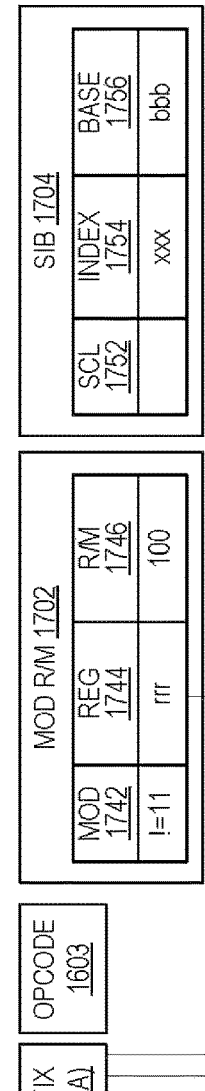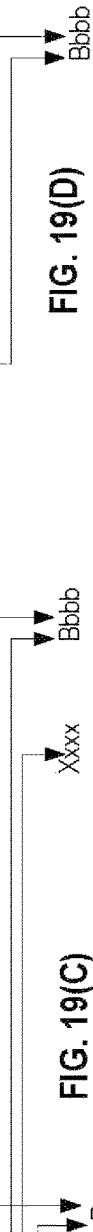

US 12,086,596 B2

INSTRUCTIONS FOR ACCELERATING KECCAK EXECUTION IN A PROCESSOR

BACKGROUND

The Secure Hash Algorithm (SHA-3) standard "Permutation-Based Hash and Extendible-Output Functions", Federal Information Processing Standards (FIPS) publication (Pub) 202, August 2015, describes the Keccak mathematical permutation function. Executing the Keccak function in a processor is compute-intensive. Some processors, including processors without vector extensions, are resource-constrained and implementing secure computing including executing Keccak functions is slow.

BRIEF DESCRIPTION OF DRAWINGS

Various examples in accordance with the present disclosure will be described with reference to the drawings, in which:

FIG. 6 is a flow diagram of another method to process the conditional rotate and XOR instruction in one implementation.

FIG. 9 is a flow diagram of a method to process the triple input bitwise logical operations instruction in one implementation.

FIG. 18 illustrates examples of a first prefix.

FIGS. 19(A)-19(D) illustrate examples of how the R, X, and B fields of the first prefix in FIG. 18 are used.

DETAILED DESCRIPTION

Figure 1:
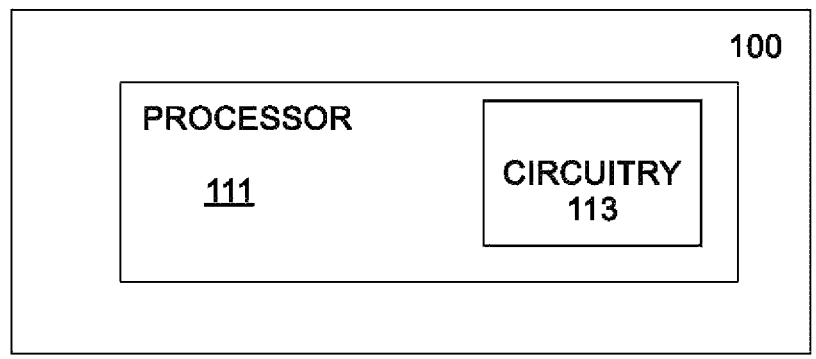
FIG. 1 is a block diagram of a computing system in one implementation.

The present disclosure relates to methods, apparatus, and systems for a conditional rotate and XOR operation in a single instruction and a triple input bitwise logical operations in a single instruction in an instruction set of a computing system. An implementation of the new conditional rotate and XOR and triple input bitwise logical operations speeds up execution of the Keccak function on general purpose processing cores, thereby improving secure computing, such as implementing secure communications protocols (e.g., transport layer security (TLS)).

According to some examples, the technologies described herein may be implemented in one or more electronic devices. Non-limiting examples of electronic devices that may utilize the technologies described herein include any kind of computing system, mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, disaggregated server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide an instruction set for conditional rotate and triple XOR and triple input bitwise logical operations.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

As described in FIPS Pub 202, the Keccak function includes a $\theta$ step, a $\rho$ step, a $\pi$ step, a $\chi$ step and a $\iota$ step, which are all repeated for each round of the Keccak function.

For standard SHA-3, Keccak function is executed for 24 rounds, which are applied on a 1,600-bit state. The state variable of the Keccak function may be represented in 25 64-bit words as a two-dimensional (2D) matrix (x=0 . . . 4 and y=0 . . . 4). The 2D matrix may be converted into a one dimensional (1D) internal memory representation as index i=5y+x.

Some examples disclosed herein provide technology for a conditional rotate and XOR instruction and a triple input bitwise logical operations instruction of an instruction set of an ISA of a computing system. The technology described herein includes new instructions for conditional rotate and XOR operations and triple input bitwise logical operations to accelerate internal sub-operations involved in SHA3/Keccak round functions on resource-constrained cores of a processor. Some cores do not have vector extensions and have a limited number of registers to hold operands for the execution unit. The implementations described herein accelerate one SHA3/Keccak execution on the target processing core.

In an implementation, execution by a processor of the new conditional rotate and XOR instruction accelerates 64-bit parity computations on five 64-bit words as well as performs an XOR operation with multiple rotations to input operands and output operands. In an implementation, this instruction has a name of "INTOP3XOR." In another implementation, execution by a processor of the triple input bitwise logical operations instruction accelerates the $\chi$ step of the Keccak function. In an implementation, this instruction has the name "COMP3LOGIC." The proposed techniques reduce the number of instructions executed to perform a 24-round Keccak function by at least 1,344 compared to executing the Keccak function on the same processing core without the new instructions.

With reference to FIG. 1, an example of a computing system 100 may include a processor 111 to perform one or more conditional rotate and XOR operations and/or one or more triple input bitwise logical operations that include at least conditional rotate and XOR instructions and/or triple input bitwise logical operations instructions, and circuitry 113 coupled to processor 111 to, in response to a single processor instruction, cause processor 111 to perform the one or more conditional rotate and XOR operations and/or one or more a triple input bitwise logical operations. For example, each of the source inputs may include one or more input arguments for one or more conditional rotate and XOR operations and/or one or more a triple input bitwise logical operations. For example, the various inputs and indications may be included in the instruction itself (e.g., through the opcode, explicit fields of the instruction, pre-determined or implicit inputs/indications, etc.), or the instruction may explicitly or implicitly point to the information that identifies the various inputs and indications. Similarly, destination locations for the one or more results may be explicit operands of the single processor instruction or may be implicit locations (e.g., pre-determined registers or memory locations). For example, in response to the single processor instruction, circuitry 113 may be further configured to cause processor 111 to store the one or more results of the one or more conditional rotate and XOR operations and/or one or more a triple input bitwise logical operations in a location indicated by the single processor instruction.

Figure 22:
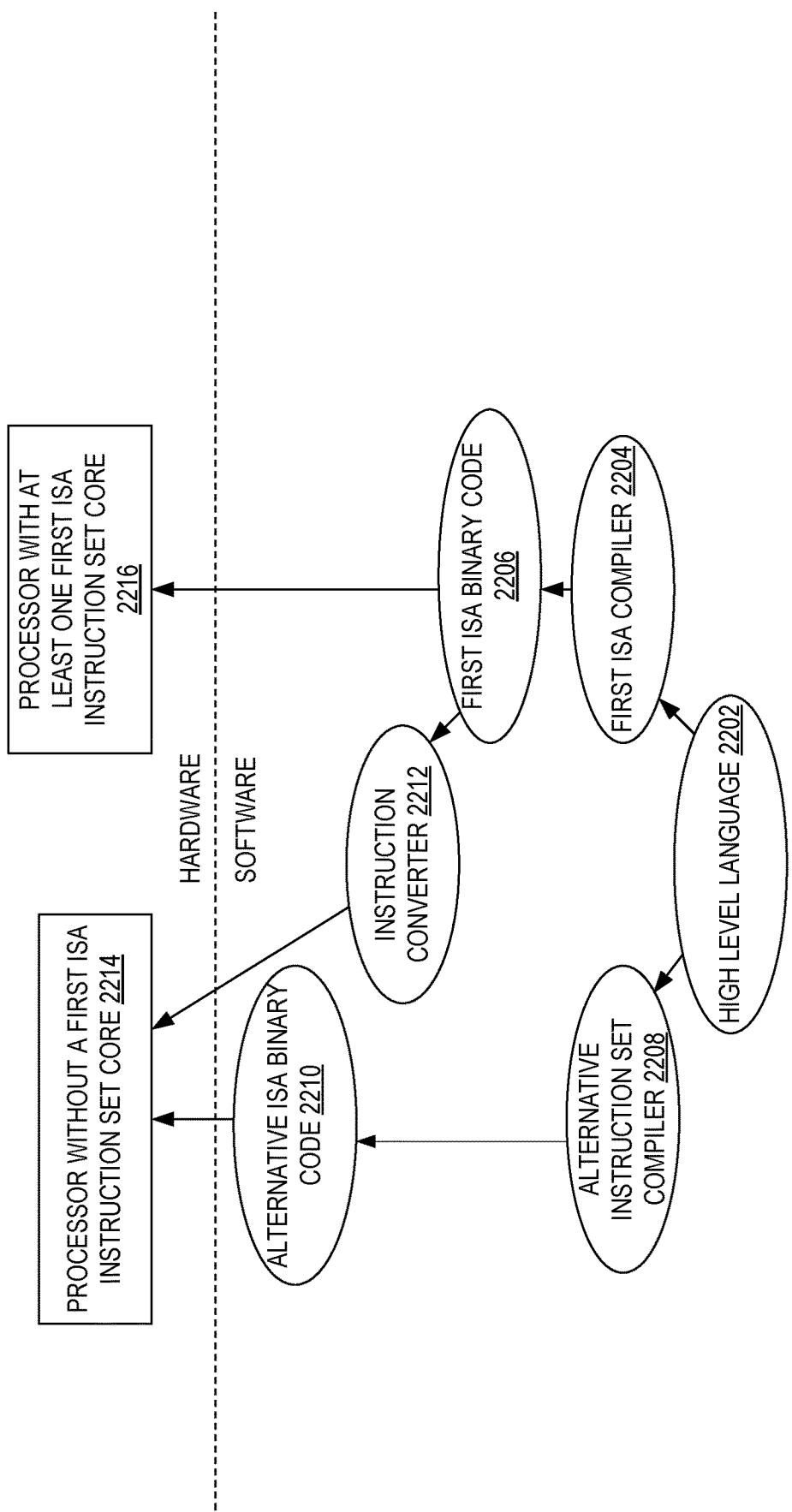
FIG. 22 is a block diagram illustrating the use of a software instruction converter to convert binary instructions in a source instruction set architecture to binary instructions in a target instruction set architecture according to examples.

For example, processor 111 may be implemented as any of the processors described below. Circuitry 113 may be incorporated in multiprocessor system 1100, processor 1170, processor 1115, coprocessor 1138, and/or processor/coprocessor 1180 (FIG. 11), processor 1200 (FIG. 12), core 1390 (FIG. 13(B)), execution units 1362 (FIGS. 13(B) and 14), and architecture core 2216 (FIG. 22).

Figure 2:
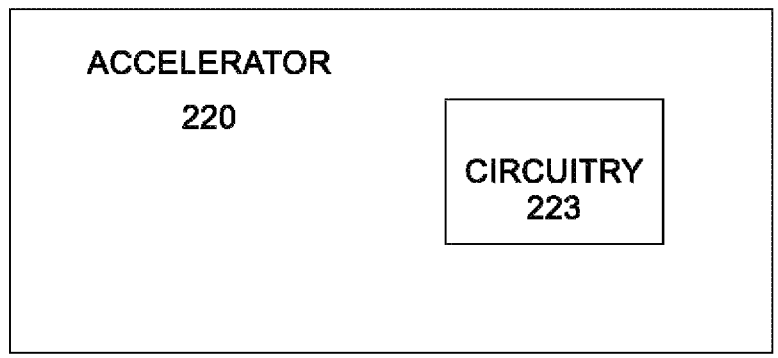
FIG. 2 is a block diagram of an accelerator in one implementation.

With reference to FIG. 2, an example of an accelerator 220 may include circuitry 223 to perform one or more conditional rotate and XOR operations and/or one or more a triple input bitwise logical operations, and circuitry 223 to cause the accelerator 220 to perform the one or more conditional rotate and XOR operations and/or one or more a triple input bitwise logical operations. For example, each of the source inputs may include one or more input arguments for one or more conditional rotate and XOR operations and/or one or more a triple input bitwise logical operations. For example, the various inputs and indications may be included in the circuitry itself (e.g., through the opcode, explicit fields of the operation, pre-determined or implicit inputs/indications, etc.), or the operation may explicitly or implicitly point to the information that identifies the various inputs and indications. Similarly, destination locations for the one or more results may be explicit operands of the operation or may be implicit locations (e.g., pre-determined registers or memory locations). For example, in response to the one or more conditional rotate and XOR operations and/or one or more a triple input bitwise logical operations, circuitry 223 may be further configured to cause accelerator 220 to store the one or more results of the one or more conditional rotate and XOR operations and/or one or more a triple input bitwise logical operations in a location indicated by the one or more conditional rotate and triple XOR operations and/or one or more a triple input bitwise logical operations, respectively.

In an implementation, the conditional rotate and XOR instruction is defined as follows.

INTOP3XOR: Conditional rotate by one of a 64-bit $x_{i+2}$ and compute XORs of three operands and conditional rotate the result and store the result into output $x_i$.

Input operands: $x_i$, $x_{i+1}$, $x_{i+2}$, k
Output operand: updated $x_i$
Computation:

$r1=k_6$; $r2=k_{5-0}$; and $x_i=(x_i \hat{} x_{i+1} \hat{} (x_{i+2}<<<r1))<<<r2$ Where $x_i$, $x_{i+1}$, $x_{i+2}$ are selected consecutive elements of the Keccak state variable array stored in a memory or a set of registers, k is a selected constant value of 7 bits stored in a memory or a register, r1 is the most significant bit of k, r2 is the six least significant bits of k, "^" is the XOR operation, and "<<<" is a left rotation operation where "x<<<r" rotates operand x towards left by r number of bits.

Execution of this instruction combines 30 XORs and 5 rotations from the θ-step with 25 rotations from the ρ-step into 25 instructions. Additionally, execution of this instruction integrates constant addition in the ι-step into the χ-step to save one instruction. This results in an approximately 59% reduction of instruction counts (e.g., from 61 down to 25) for computing the θ, ρ and ι steps compared to executing these steps on existing 64-bit integer processing cores.

Figure 3:
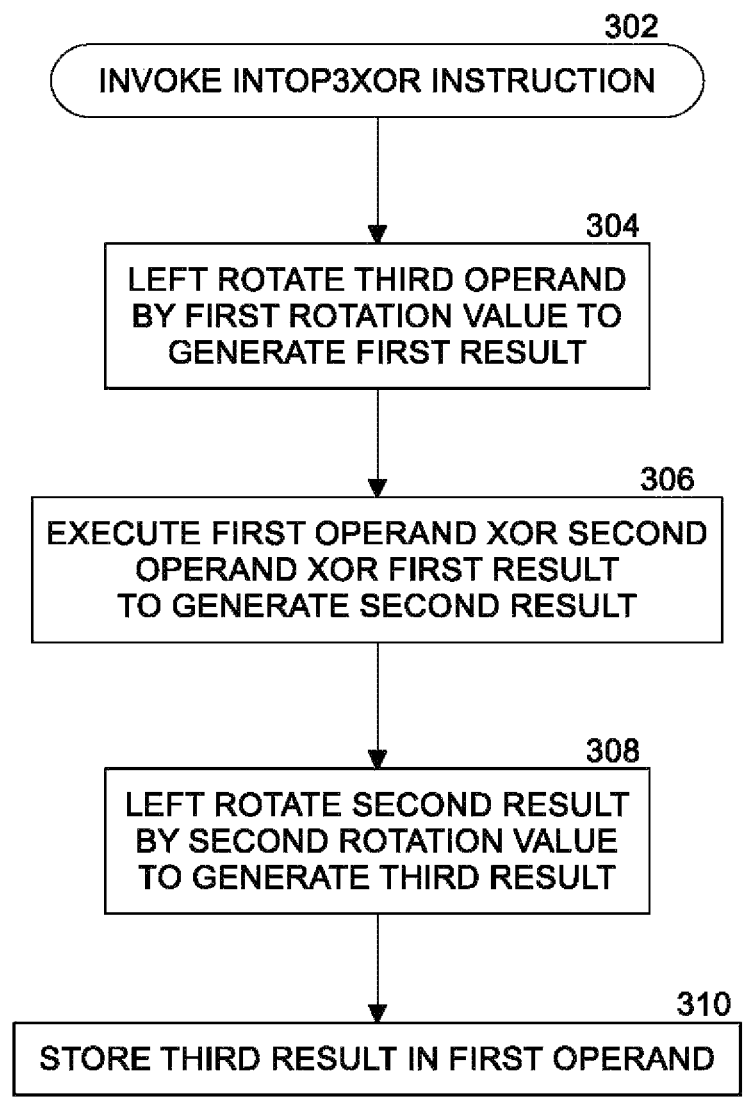
FIG. 3 is a flow diagram of a method to process a conditional rotate and triple exclusive-OR (XOR) instruction in one implementation.

FIG. 3 is a flow diagram of a method 300 to process a conditional rotate and XOR instruction in one implementation. At block 302, a conditional rotate and XOR instruction (INTOP3XOR) is invoked, for example, by processor 111 and/or circuitry 113 of computing system 100 or circuitry 223 of accelerator 220. As used herein, a first operand is $x_i$, a second operand is $x_{i+1}$, a third operand is $x_{i+2}$, a first rotation value is r1, and a second rotation value is r2, where i is an index into the Keccak state variable array. At block 304, circuitry 113 left rotates the third operand by the first rotation value to generate a first result. At block 306, circuitry 113 executes the first operand XOR the second operand XOR the first result to generate a second result. At block 308, circuitry 113 left rotates the second result by the second rotation value to generate a third result. At block 310, circuitry 113 stores the third result in the first operand. In another implementation, blocks 302 through 310 are performed by circuitry 223 of accelerator 220.

Figure 4:
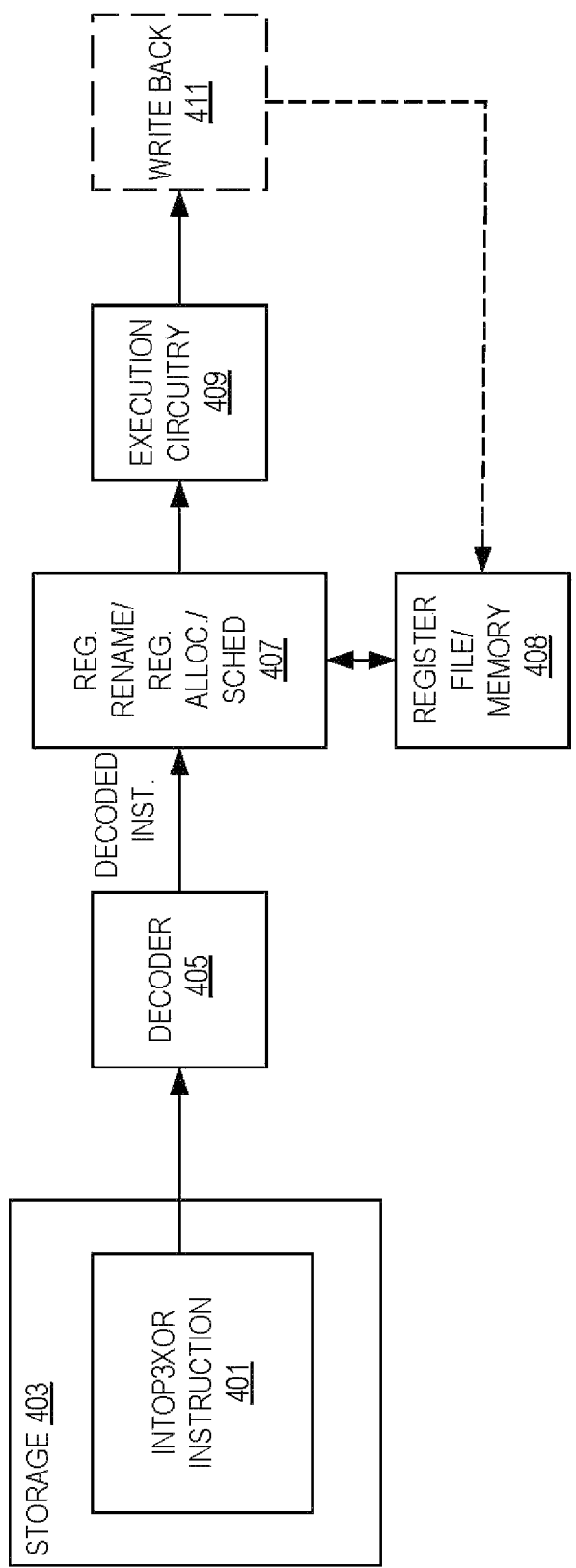
FIG. 4 is a block diagram of computing hardware to process the conditional rotate and XOR instruction in one implementation.

FIG. 4 illustrates examples of computing hardware to process a conditional rotate and XOR instruction. As illustrated, storage 403 stores a conditional rotate and XOR (INTOP3XOR) instruction 401 to be executed.

The conditional rotate and XOR instruction 401 is received by decoder circuitry 404. For example, the decoder circuitry 404 receives this instruction from fetch circuitry (not shown). The instruction may be in any suitable format, such as that describe with reference to FIG. 16 below. In an example, the instruction includes fields for an opcode.

More detailed examples of at least one instruction format for the instruction will be detailed later. The decoder circuitry 404 decodes the instruction into one or more operations. In some examples, this decoding includes generating a plurality of micro-operations to be performed by execution circuitry (such as execution circuitry 409). The decoder circuitry 404 also decodes instruction prefixes.

In some examples, register renaming, register allocation, and/or scheduling circuitry 407 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 408 may store data as operands of the instruction to be operated on by execution circuitry 409. Exemplary register types include packed data registers, general purpose registers (GPRs), model specific registers (MSRs) and floating-point registers.

Execution circuitry 409 executes the decoded instruction. Exemplary detailed execution circuitry includes execution cluster(s) 1360 shown in FIG. 13(B), etc. The execution of the decoded instruction causes the execution circuitry 409 to perform the conditional rotate and XOR operation. In some examples, retirement/write back circuitry 411 architecturally retires the instruction.

An example of a format for a conditional rotate and XOR instruction is OPCODE, first operand (e.g., $x_i$), second operand (e.g., $x_{i+1}$), third operand (e.g., $x_{i+2}$), and fourth operand (e.g., k). In some examples, OPCODE is the opcode mnemonic of the instruction (e.g., INTOP3XOR).

Figure 5:
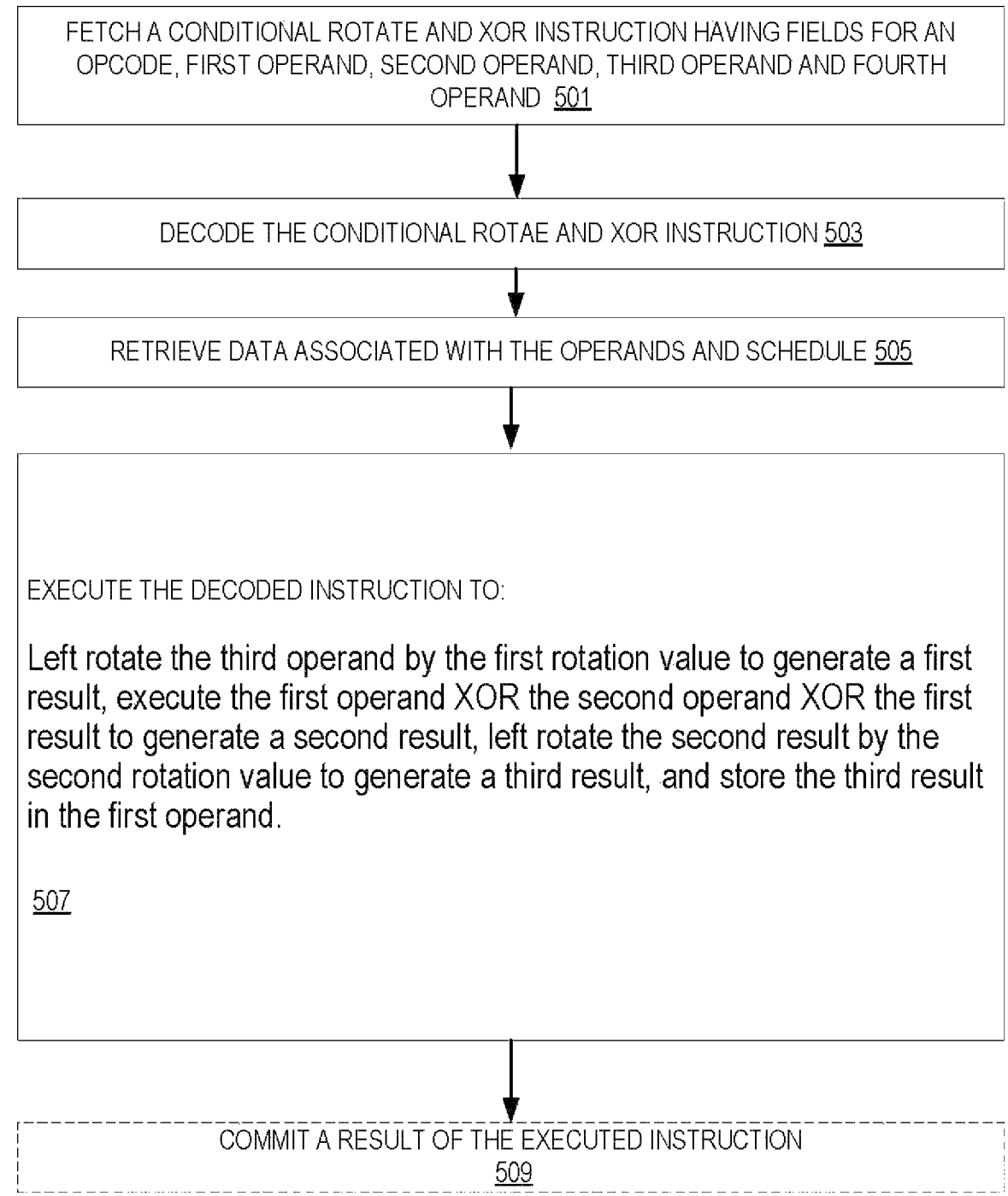
FIG. 5 is a flow diagram of a method to process the conditional rotate and XOR instruction in one implementation.

FIG. 5 is a flow diagram of a method 500 to process a conditional rotate and triple XOR instruction in one implementation. For example, a processor core as shown in FIG. 12(B), a pipeline as detailed below, etc., performs this method. At block 501, an instance of a single conditional rotate and XOR instruction is fetched. The instruction includes a field for an opcode and fields for the first operand, second operand, third operand, and fourth operand. In some examples, the instruction is fetched from an instruction cache. The opcode indicates the conditional rotate and XOR operation to be performed.

The fetched instruction is decoded at block 503. For example, the fetched conditional rotate and XOR instruction is decoded by decoder circuitry such as decoder circuitry 404 or decode circuitry 1340 detailed herein. The decoded conditional rotate and XOR instruction is scheduled at block 505. At block 507, the decoded conditional rotate and XOR instruction is executed by execution circuitry (hardware) such as execution circuitry 409 shown in FIG. 4, or execution cluster(s) 1260 shown in FIG. 13(B). For the conditional rotate and XOR instruction, the execution will cause execution circuitry to perform the operations described in connection with FIG. 3. In an implementation, the execution circuitry left rotates the third operand by the first rotation value to generate a first result, executes the first operand XOR the second operand XOR the first result to generate a second result, left rotates the second result by the second rotation value to generate a third result, and stores the third result in the first operand. In some examples, the executed conditional rotate and XOR instruction is committed or retired at 509.

Figure 13A:
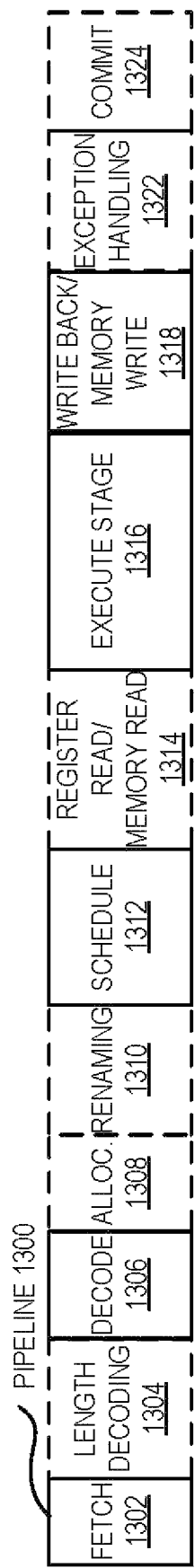
FIG. 13(A) is a block diagram illustrating both an exemplary in-order pipeline and an exemplary register renaming, out-of-order issue/execution pipeline according to examples.
Figure 13B:
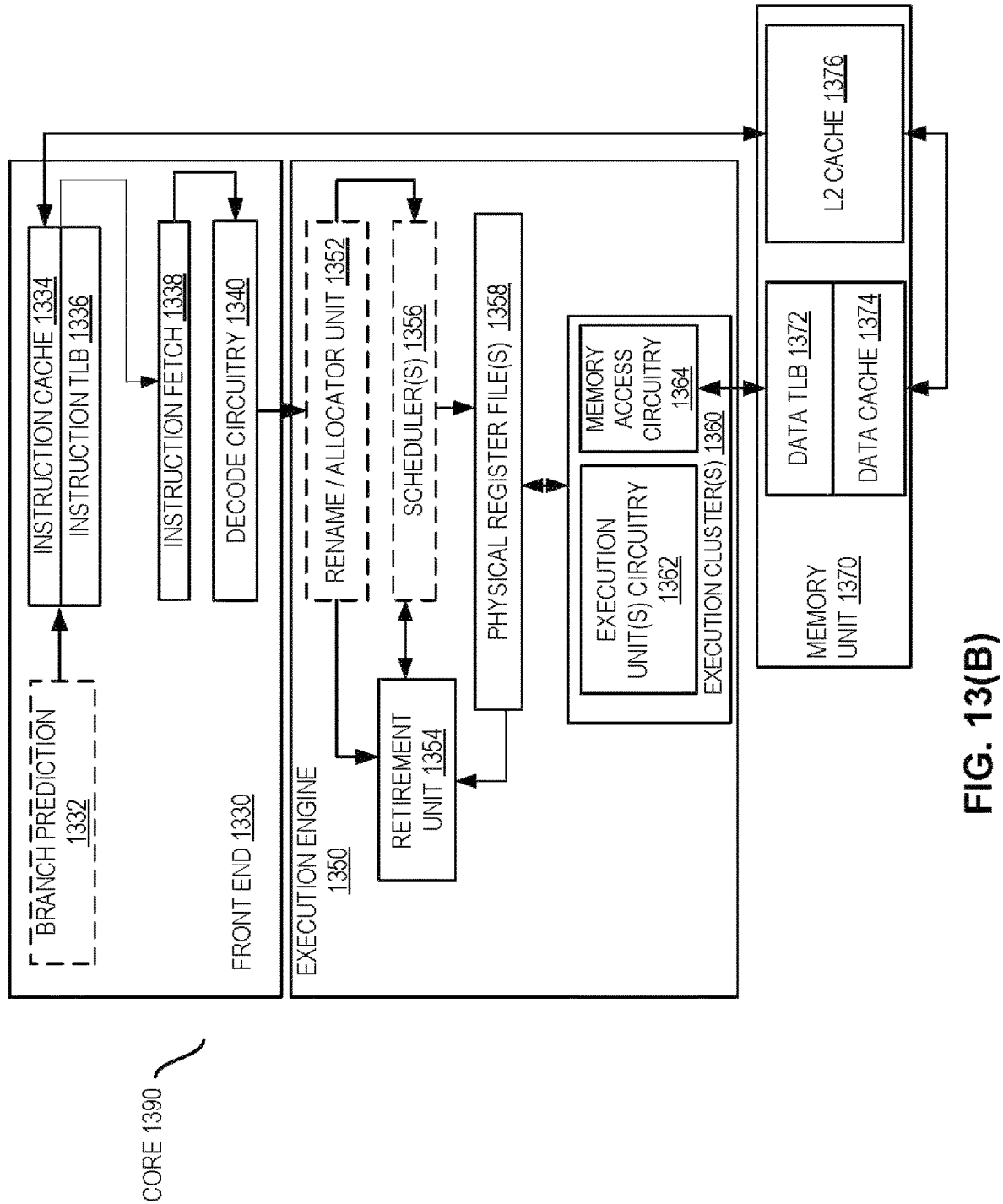
FIG. 13(B) is a block diagram illustrating both an exemplary example of an in-order architecture core and an exemplary register renaming, out-of-order issue/execution architecture core to be included in a processor according to examples.

FIG. 6 is a flow diagram of another method 600 to process a conditional rotate and XOR instruction in one implementation using emulation or binary translation. For example, a processor core as shown in FIG. 13(B), a pipeline and/or emulation/translation layer perform aspects of this method.

An instance of a single conditional rotate and XOR instruction of a first instruction set architecture is fetched at 601. The instance of the single conditional rotate and XOR instruction of the first instruction set architecture including fields for an opcode, first operand, second operand, third operand, and fourth operand. In some examples, the instruction is fetched from an instruction cache. The opcode indicates at least one conditional rotate and XOR operation to be performed.

The fetched single conditional rotate and XOR instruction of the first instruction set architecture is translated into one or more instructions of a second instruction set architecture at 602. This translation is performed by a translation and/or emulation layer of software in some examples. In some examples, this translation is performed by an instruction converter 2212 as shown in FIG. 22. In some examples, the translation is performed by hardware translation circuitry.

The one or more translated instructions of the second instruction set architecture are decoded at 603. For example, the translated instructions are decoded by decoder circuitry such as decoder circuitry 404 or decode circuitry 1340 detailed herein. In some examples, the operations of translation and decoding at 602 and 603 are merged.

The one or more decoded instructions are scheduled at 605.

At 607, the decoded instruction(s) of the second instruction set architecture is/are executed by execution circuitry (hardware) such as execution circuitry 409 shown in FIG. 4, or execution cluster(s) 1360 shown in FIG. 13(B), to perform the operation(s) indicated by the opcode of the single conditional rotate and XOR instruction of the first instruction set architecture. For the conditional rotate and triple XOR instruction, the execution will cause execution circuitry to perform the operations described in connection with FIG. 3. In an implementation, the execution circuitry left rotates the third operand by the first rotation value to generate a first result, executes the first operand XOR the second operand XOR the first result to generate a second result, left rotates the second result by the second rotation value to generate a third result, and stores the third result in the first operand. In some examples, the instruction is committed or retired at 609.

In an implementation, the triple input bitwise logical operations instruction is defined as follows.
COMP3LOGIC: Execute the second operand AND the third operand XOR the first operand XOR the third operand and store a result into output $x_i$.

Input operands: $x_i$, $x_{i+1}$, $x_{i+2}$
Output operand: updated $x_i$
Computation:

$$x_i = x_i \char`\^ (x_{i+1} \& x_{i+2}) \char`\^ x_{i+2}$$

Where $x_i$, $x_{i+1}$, $x_{i+2}$ are selected consecutive elements of the Keccak state variable stored in a memory or a set of registers, "^" is the XOR operation, and "&" is the AND operation.

In another embodiment this instruction can be defined to compute the same result by executing NOT the second operand AND the third operand XOR the first operand and storing the result into the first operand:

$$x_i = x_i \char`\^ (\sim x_{i+1} \& x_{i+2})$$

Where "~" is the NOT operation.
This new instruction combines 20 XORs with 20 AND-NOTs into 20 instructions, which results in an approximately 50% reduction of instruction counts (e.g., 40 down to 20) for computing the x-step. Note that the order of execution of the first XOR operation and the second XOR operation may be interchanged because XOR is associative (e.g., perform first XOR operation and then the second operation, or perform the second XOR operation and then the first XOR operation).

Figure 7:
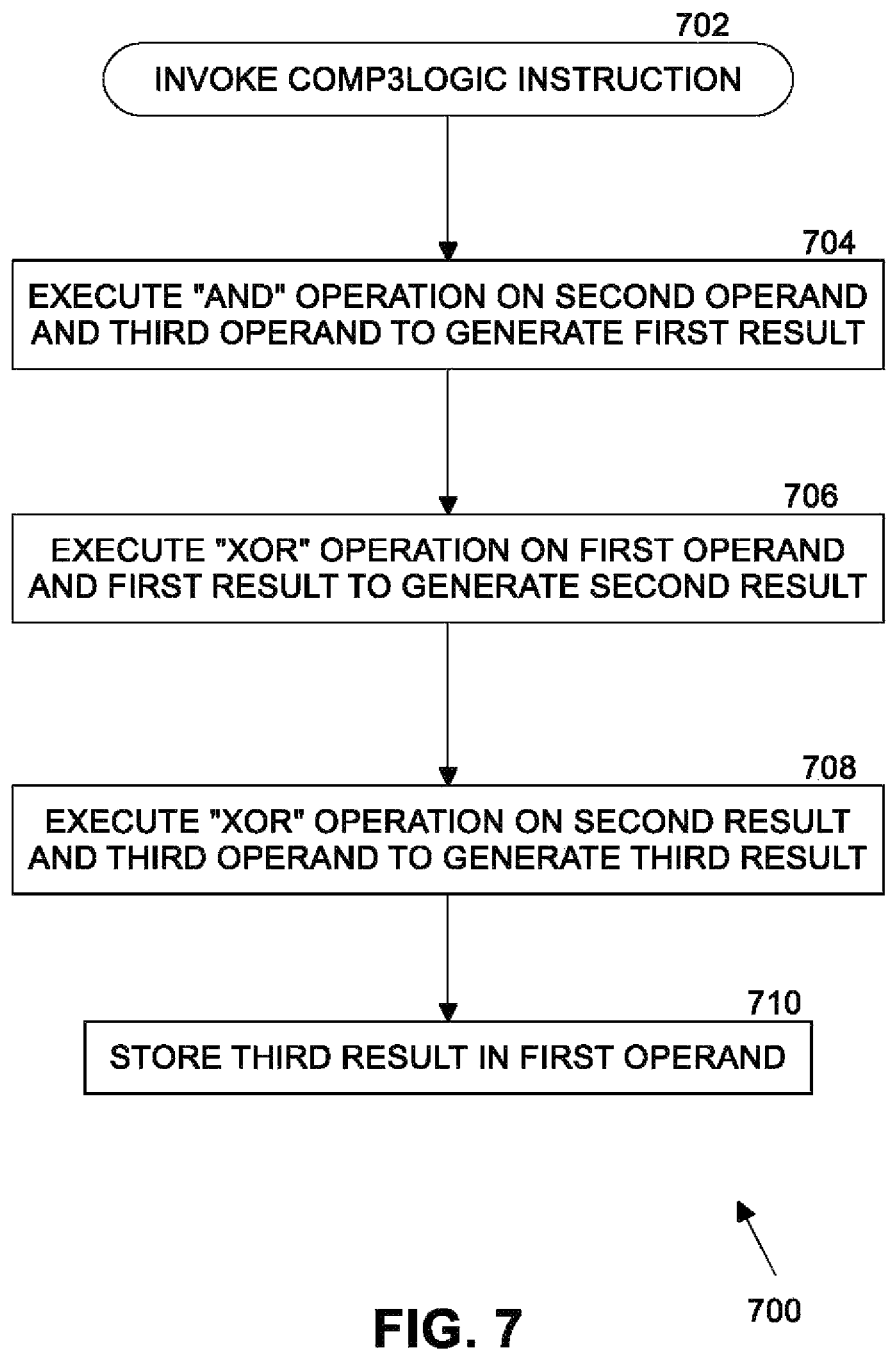
FIG. 7 is a flow diagram of a method to process the triple input bitwise logical operations instruction in another implementation.

FIG. 7 is a flow diagram of a method 700 to process the triple input bitwise logical operations instruction in another implementation. At block 702, triple input bitwise logical operations instruction (e.g., COMP3LOGIC) is invoked, for example, by processor 111 and/or circuitry 113 of computing system 100 or circuitry 223 of accelerator 220. As used herein, a first operand is $x_i$, a second operand is $x_{i+1}$, and a third operand is $x_{i+2}$, where i is an index into the Keccak state variable array. At block 704, circuitry 113 executes the second operand AND the third operand to generate a first result. At block 706, circuitry 113 executes an XOR operation on the first operand and the first result to generate a second result. At block 708, circuitry 113 executes an XOR operation on the second result and the third operand to generate a third result. In another implementation, block 708 may be performed before block 706. At block 710, circuitry 113 stores the third result in the first operand. In another implementation, blocks 702 through 710 are performed by circuitry 223 of accelerator 220.

In another implementation, blocks 704 through 708 may be replaced by an equivalent block to execute the second operand AND the third operand to generate a first result, execute the first operand XOR the first result XOR the third operand to generate a second result, and store the second result in the first operand.

Figure 8:
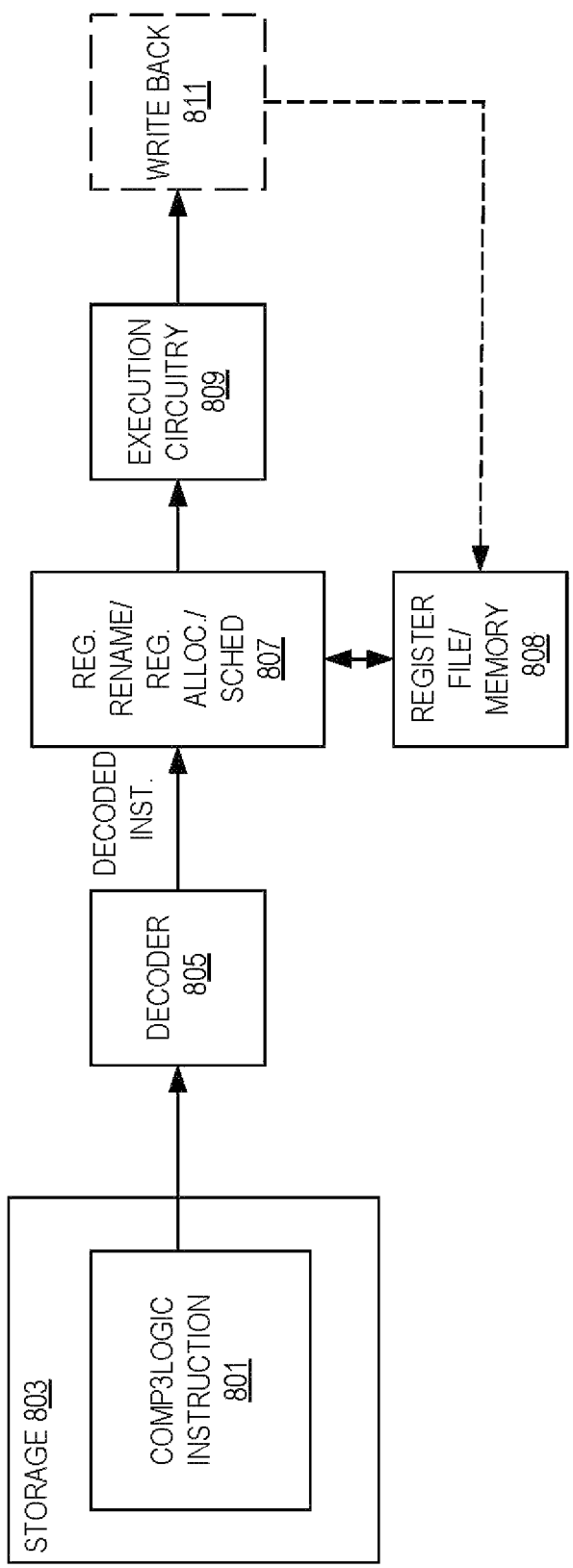
FIG. 8 is a block diagram of computing hardware to process the triple input bitwise logical operations instruction in one implementation.

FIG. 8 illustrates examples of computing hardware to process a triple input bitwise logic operations instruction. As illustrated, storage 803 stores a triple input bitwise logic operations (COMP3LOGIC) instruction 801 to be executed.

The triple input bitwise logic operations instruction 801 is received by decoder circuitry 804. For example, the decoder circuitry 804 receives this instruction from fetch circuitry (not shown). The instruction may be in any suitable format, such as that describe with reference to FIG. 16 below. In an example, the instruction includes fields for an opcode. More detailed examples of at least one instruction format for the instruction will be detailed later. The decoder circuitry 804 decodes the instruction into one or more operations. In some examples, this decoding includes generating a plurality of micro-operations to be performed by execution circuitry (such as execution circuitry 809). The decoder circuitry 804 also decodes instruction prefixes.

In some examples, register renaming, register allocation, and/or scheduling circuitry 807 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 808 may store data as operands of the instruction to be operated on by execution circuitry 809. Exemplary register types include packed data registers, general purpose registers (GPRs), model specific registers (MSRs) and floating-point registers.

Execution circuitry 809 executes the decoded instruction. Exemplary detailed execution circuitry includes execution cluster(s) 1360 shown in FIG. 13(B), etc. The execution of the decoded instruction causes the execution circuitry 809 to perform the triple input bitwise logic operations. In some examples, retirement/write back circuitry 811 architecturally retires the instruction.

An example of a format for a triple input bitwise logic operations instruction is OPCODE, first operand (e.g., $x_i$), second operand (e.g., $x_{i+1}$), and third operand (e.g., $x_{i+2}$). In some examples, OPCODE is the opcode mnemonic of the instruction (e.g., COMP3LOGIC).

FIG. 9 is a flow diagram of a method 900 to process a triple input bitwise logic operations instruction in one implementation. For example, a processor core as shown in FIG. 12(B), a pipeline as detailed below, etc., performs this method. At block 901, an instance of a single triple input bitwise logic operations instruction is fetched. The instruction includes a field for an opcode and fields for the first operand, second operand, and third operand. In some examples, the instruction is fetched from an instruction cache. The opcode indicates the triple input bitwise logic operations to be performed.

The fetched instruction is decoded at block 903. For example, the fetched triple input bitwise logic operations instruction is decoded by decoder circuitry such as decoder circuitry 804 or decode circuitry 1340 detailed herein. The decoded triple input bitwise logic operations instruction is scheduled at block 905. At block 907, the decoded triple input bitwise logic operations instruction is executed by execution circuitry (hardware) such as execution circuitry 809 shown in FIG. 8, or execution cluster(s) 1260 shown in FIG. 13(B). For the triple input bitwise logic operations instruction, the execution will cause execution circuitry to perform the operations described in connection with FIG. 7. In an implementation, the execution circuitry executes an AND operation on the second operand and the third operand to generate a first result, executes the first operand XOR the first result to generate a second result, executes the second result XOR the third operand to generate a third result, and stores the third result in the first operand. In some examples, the executed triple input bitwise logic operations instruction is committed or retired at 909.

Figure 10:
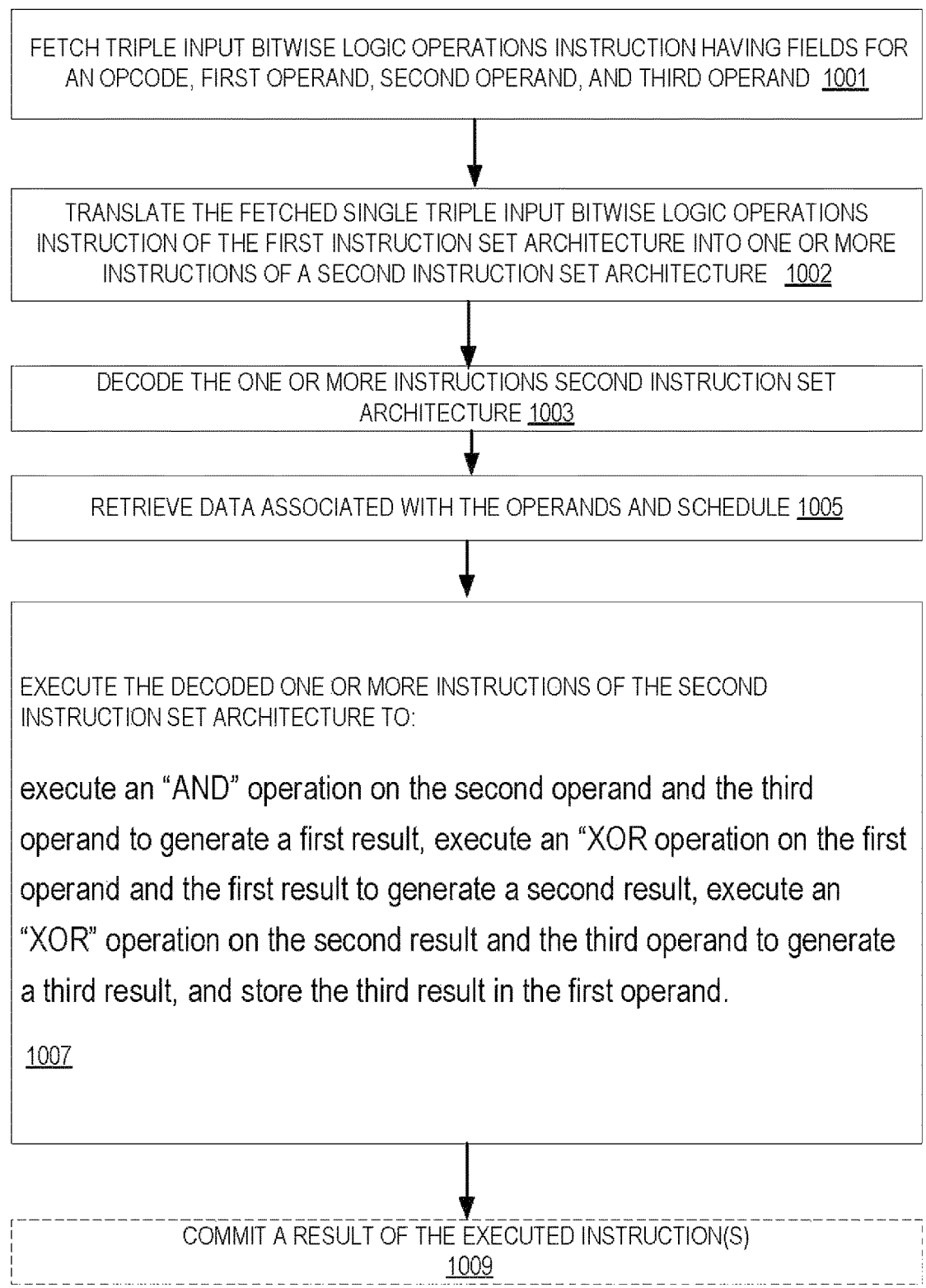
FIG. 10 is a flow diagram of another method to process the triple input bitwise logical operations instruction in one implementation.

FIG. 10 is a flow diagram of another method 1000 to process a triple input bitwise logic operations instruction in one implementation using emulation or binary translation. For example, a processor core as shown in FIG. 13(B), a pipeline and/or emulation/translation layer perform aspects of this method.

An instance of a single triple input bitwise logic operations instruction of a first instruction set architecture is fetched at 1001. The instance of the single triple input bitwise logic operations instruction of the first instruction set architecture including fields for an opcode, first operand, second operand, and third operand. In some examples, the instruction is fetched from an instruction cache. The opcode indicates at least one triple input bitwise logic operations operation to be performed.

The fetched single triple input bitwise logic operations instruction of the first instruction set architecture is translated into one or more instructions of a second instruction set architecture at 1002. This translation is performed by a translation and/or emulation layer of software in some examples. In some examples, this translation is performed by an instruction converter 2212 as shown in FIG. 22. In some examples, the translation is performed by hardware translation circuitry.

The one or more translated instructions of the second instruction set architecture are decoded at 1003. For example, the translated instructions are decoded by decoder circuitry such as decoder circuitry 804 or decode circuitry 1340 detailed herein. In some examples, the operations of translation and decoding at 1002 and 1003 are merged.

The one or more decoded instructions are scheduled at 1005.

At 1007, the decoded instruction(s) of the second instruction set architecture is/are executed by execution circuitry (hardware) such as execution circuitry 809 shown in FIG. 8, or execution cluster(s) 1360 shown in FIG. 13(B), to perform the operation(s) indicated by the opcode of the single triple input bitwise logic operations instruction of the first instruction set architecture. For the triple input bitwise logic operations instruction, the execution will cause execution circuitry to perform the operations described in connection with FIG. 7. In an implementation, the execution circuitry executes an "AND" operation on the second operand and the third operand to generate a first result, executes the first operand XOR the first result to generate a second result, executes the second result XOR the third operand to generate a third result, and stores the third result in the first operand. In some examples, the instruction is committed or retired at 1009.

Exemplary Computer Architectures

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 11:
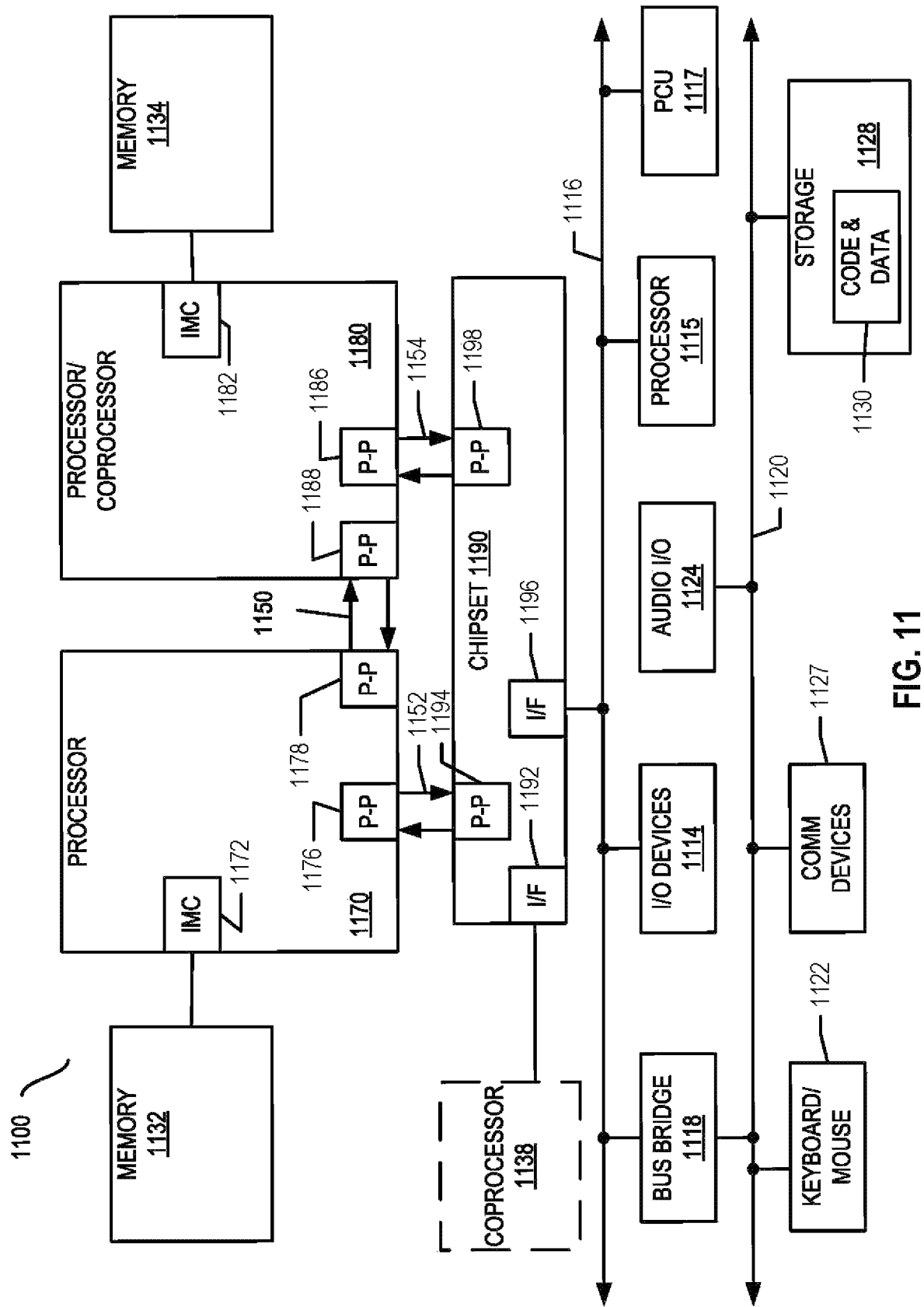
FIG. 11 illustrates an exemplary computing system.

FIG. 11 illustrates an exemplary system. Multiprocessor system 1100 is a point-to-point interconnect system and includes a plurality of processors including a first processor 1170 and a second processor 1180 coupled via a point-to-point interconnect 1150. In some examples, the first processor 1170 and the second processor 1180 are homogeneous. In some examples, first processor 1170 and the second processor 1180 are heterogenous.

Processors 1170 and 1180 are shown including integrated memory controller (IMC) units circuitry 1172 and 1182, respectively. Processor 1170 also includes as part of its interconnect controller units point-to-point (P-P) interfaces 1176 and 1178; similarly, second processor 1180 includes P-P interfaces 1186 and 1188. Processors 1170, 1180 may exchange information via the point-to-point (P-P) interconnect 1150 using P-P interface circuits 1178, 1188. IMCs 1172 and 1182 couple the processors 1170, 1180 to respective memories, namely a memory 1132 and a memory 1134, which may be portions of main memory locally attached to the respective processors.

Processors 1170, 1180 may each exchange information with a chipset 1190 via individual P-P interconnects 1152, 1154 using point to point interface circuits 1176, 1194, 1186, 1198. Chipset 1190 may optionally exchange information with a coprocessor 1138 via a high-performance interface 1192. In some examples, the coprocessor 1138 is a special-purpose processor, such as, for example, a high-throughput processor, a network or communication processor, compression engine, graphics processor, general purpose graphics processing unit (GPGPU), embedded processor, or the like.

A shared cache (not shown) may be included in either processor 1170, 1180 or outside of both processors, yet connected with the processors via P-P interconnect, such that either or both processors' local cache information may be stored in the shared cache if a processor is placed into a low power mode.

Chipset 1190 may be coupled to a first interconnect 1116 via an interface 1196. In some examples, first interconnect 1116 may be a Peripheral Component Interconnect (PCI) interconnect, or an interconnect such as a PCI Express interconnect or another I/O interconnect. In some examples, one of the interconnects couples to a power control unit (PCU) 1117, which may include circuitry, software, and/or firmware to perform power management operations with regard to the processors 1170, 1180 and/or co-processor 1138. PCU 1117 provides control information to a voltage regulator (not shown) to cause the voltage regulator to generate the appropriate regulated voltage. PCU 1117 also provides control information to control the operating voltage generated. In various examples, PCU 1117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1117 is illustrated as being present as logic separate from the processor 1170 and/or processor 1180. In other cases, PCU 1117 may execute on a given one or more of cores (not shown) of processor 1170 or 1180. In some cases, PCU 1117 may be implemented as a microcontroller (dedicated or general-purpose) or other control logic configured to execute its own dedicated power management code, sometimes referred to as P-code. In yet other examples, power management operations to be performed by PCU 1117 may be implemented externally to a processor, such as by way of a separate power management integrated circuit (PMIC) or another component external to the processor. In yet other examples, power management operations to be performed by PCU 1117 may be implemented within BIOS or other system software.

Various I/O devices 1114 may be coupled to first interconnect 1116, along with a bus bridge 1118 which couples first interconnect 1116 to a second interconnect 1120. In some examples, one or more additional processor(s) 1115, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 1116. In some examples, second interconnect 1120 may be a low pin count (LPC) interconnect. Various devices may be coupled to second interconnect 1120 including, for example, a keyboard and/or mouse 1122, communication devices 1127 and a storage circuitry 1128. Storage circuitry 1128 may be a disk drive or other mass storage device which may include instructions/code and data 1130, in some examples. Further, an audio I/O 1124 may be coupled to second interconnect 1120. Note that other architectures than the point-to-point architecture described above are possible. For example, instead of the point-to-point architecture, a system such as multiprocessor system 1100 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 12:
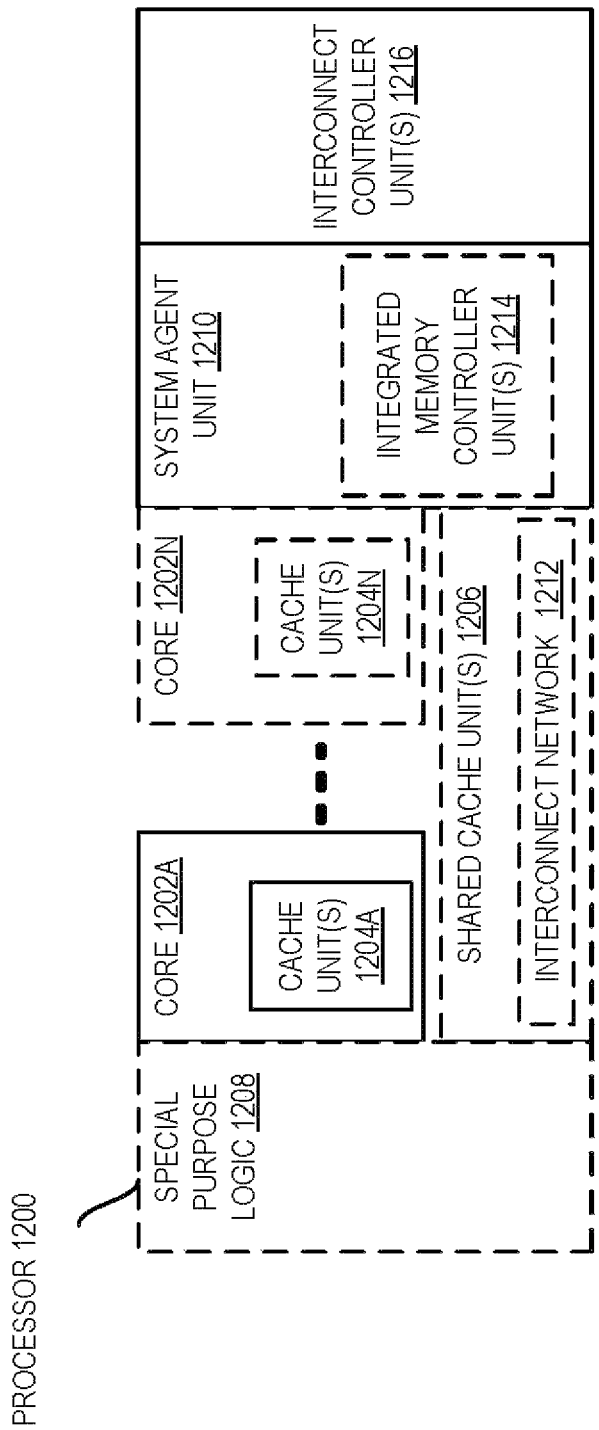
FIG. 12 illustrates a block diagram of an example processor that may have more than one core and an integrated memory controller.

FIG. 12 illustrates a block diagram of an example processor 1200 that may have more than one core and an integrated memory controller. The solid lined boxes illustrate a processor 1200 with a single core 1202A, a system agent 1210, a set of one or more interconnect controller unit(s) circuitry 1216, while the optional addition of the dashed lined boxes illustrates an alternative processor 1200 with multiple cores 1202(A)-(N), a set of one or more integrated memory controller unit(s) circuitry 1214 in the system agent unit circuitry 1210, and special purpose logic 1208, as well as a set of one or more interconnect controller units circuitry 1216. Note that the processor 1200 may be one of the processors 1170 or 1180, or co-processor 1138 or 1115 of FIG. 11.

Thus, different implementations of the processor 1200 may include: 1) a CPU with the special purpose logic 1208 being integrated graphics and/or scientific (throughput) logic (which may include one or more cores, not shown), and the cores 1202(A)-(N) being one or more general purpose cores (e.g., general purpose in-order cores, general purpose out-of-order cores, or a combination of the two); 2) a coprocessor with the cores 1202(A)-(N) being a large number of special purpose cores intended primarily for graphics and/or scientific (throughput); and 3) a coprocessor with the cores 1202(A)-(N) being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, bipolar complementary metal oxide semiconductor (CMOS) (BICMOS), CMOS, or N-type metal oxide semiconductor (NMOS).

A memory hierarchy includes one or more levels of cache unit(s) circuitry 1204(A)-(N) within the cores 1202(A)-(N), a set of one or more shared cache unit(s) circuitry 1206, and external memory (not shown) coupled to the set of integrated memory controller unit(s) circuitry 1214. The set of one or more shared cache unit(s) circuitry 1206 may include one or more mid-level caches, such as level 2 (L2), level 3 (L3), level 4 (L4), or other levels of cache, such as a last level cache (LLC), and/or combinations thereof. While in some examples ring-based interconnect network circuitry 1212 interconnects the special purpose logic 1208 (e.g., integrated graphics logic), the set of shared cache unit(s) circuitry 1206, and the system agent unit circuitry 1210, alternative examples use any number of well-known techniques for interconnecting such units. In some examples, coherency is maintained between one or more of the shared cache unit(s) circuitry 1206 and cores 1202(A)-(N).

In some examples, one or more of the cores 1202(A)-(N) are capable of multi-threading. The system agent unit circuitry 1210 includes those components coordinating and operating cores 1202(A)-(N). The system agent unit circuitry 1210 may include, for example, power control unit (PCU) circuitry and/or display unit circuitry (not shown). The PCU may be or may include logic and components needed for regulating the power state of the cores 1202(A)-(N) and/or the special purpose logic 1208 (e.g., integrated graphics logic). The display unit circuitry is for driving one or more externally connected displays.

The cores 1202(A)-(N) may be homogenous or heterogeneous in terms of architecture instruction set architecture (ISA); that is, two or more of the cores 1202(A)-(N) may be capable of executing the same ISA, while other cores may be capable of executing only a subset of that ISA or a ISA.
Exemplary Core Architectures—in-Order and Out-of-Order Core Block Diagram FIG. 13(A) is a block diagram illustrating both an exemplary in-order pipeline and an exemplary register renaming, out-of-order issue/execution pipeline according to examples. FIG. 13(B) is a block diagram illustrating both an exemplary example of an in-order architecture core and an exemplary register renaming, out-of-order issue/execution architecture core to be included in a processor according to examples. The solid lined boxes in FIGS. 13(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13(A), a processor pipeline 1300 includes a fetch stage 1302, an optional length decoding stage 1304, a decode stage 1306, an optional allocation (Alloc) stage 1308, an optional renaming stage 1310, a schedule (also known as a dispatch or issue) stage 1312, an optional register read/memory read stage 1314, an execute stage 1316, a write back/memory write stage 1318, an optional exception handling stage 1322, and an optional commit stage 1324. One or more operations can be performed in each of these processor pipeline stages. For example, during the fetch stage 1302, one or more instructions are fetched from instruction memory, during the decode stage 1306, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1306 and the register read/memory read stage 1314 may be combined into one pipeline stage. In one example, during the execute stage 1316, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution core architecture may implement the pipeline 1300 as follows: 1) the instruction fetch 1338 performs the fetch and length decoding stages 1302 and 1304; 2) the decode circuitry 1340 performs the decode stage 1306; 3) the rename/allocator unit circuitry 1352 performs the allocation stage 1308 and renaming stage 1310; 4) the scheduler(s) circuitry 1356 performs the schedule stage 1312; 5) the physical register file(s) circuitry 1358 and the memory unit circuitry 1370 perform the register read/memory read stage 1314; the execution cluster(s) 1360 perform the execute stage 1316; 6) the memory unit circuitry 1370 and the physical register file(s) circuitry 1358 perform the write back/memory write stage 1318; 7) various circuitry may be involved in the exception handling stage 1322; and 8) the retirement unit circuitry 1354 and the physical register file(s) circuitry 1358 perform the commit stage 1324.

FIG. 13(B) shows processor core 1390 including front-end unit circuitry 1330 coupled to an execution engine unit circuitry 1350, and both are coupled to a memory unit circuitry 1370. The core 1390 may be a reduced instruction set architecture computing (RISC) core, a complex instruction set architecture computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit circuitry 1330 may include branch prediction circuitry 1332 coupled to an instruction cache circuitry 1334, which is coupled to an instruction translation lookaside buffer (TLB) 1336, which is coupled to instruction fetch circuitry 1338, which is coupled to decode circuitry 1340. In one example, the instruction cache circuitry 1334 is included in the memory unit circuitry 1370 rather than the front-end circuitry 1330. The decode circuitry 1340 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1340 may further include an address generation unit circuitry (AGU, not shown). In one example, the AGU generates an LSU address using forwarded register ports, and may further perform branch forwarding (e.g., immediate offset branch forwarding, LR register branch forwarding, etc.). The decode circuitry 1340 may be implemented using various different mechanisms. Examples of suitable mechanisms include, but are not limited to, look-up tables, hardware implementations, programmable logic arrays (PLAs), microcode read only memories (ROMs), etc. In one example, the core 1390 includes a microcode ROM (not shown) or other medium that stores microcode for certain macroinstructions (e.g., in decode circuitry 1340 or otherwise within the front end circuitry 1330). In one example, the decode circuitry 1340 includes a micro-operation (micro-op) or operation cache (not shown) to hold/cache decoded operations, micro-tags, or micro-operations generated during the decode or other stages of the processor pipeline 1300. The decode circuitry 1340 may be coupled to rename/allocator unit circuitry 1352 in the execution engine circuitry 1350.

The execution engine circuitry 1350 includes the rename/allocator unit circuitry 1352 coupled to a retirement unit circuitry 1354 and a set of one or more scheduler(s) circuitry 1356. The scheduler(s) circuitry 1356 represents any number of different schedulers, including reservations stations, central instruction window, etc. In some examples, the scheduler(s) circuitry 1356 can include arithmetic logic unit (ALU) scheduler/scheduling circuitry, ALU queues, arithmetic generation unit (AGU) scheduler/scheduling circuitry, AGU queues, etc. The scheduler(s) circuitry 1356 is coupled to the physical register file(s) circuitry 1358. Each of the physical register file(s) circuitry 1358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1358 includes vector registers unit circuitry, write-mask registers unit circuitry, and scalar register unit circuitry. These register units may provide architectural vector registers, vector mask registers, general-purpose registers, etc. The physical register file(s) circuitry 1358 is overlapped by the retirement unit circuitry 1354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1354 and the physical register file(s) circuitry 1358 are coupled to the execution cluster(s) 1360. The execution cluster(s) 1360 includes a set of one or more execution unit(s) circuitry 1362 and a set of one or more memory access circuitry 1364. The execution unit(s) circuitry 1362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1356, physical register file(s) circuitry 1358, and execution cluster(s) 1360 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1364). It should also be understood that where separate pipelines are used, one or more of these pipelines may be out-of-order issue/execution and the rest in-order.

In some examples, the execution engine unit circuitry 1350 may perform load store unit (LSU) address/data pipelining to an Advanced Microcontroller Bus (AMB) interface (not shown), and address phase and writeback, data phase load, store, and branches.

The set of memory access circuitry 1364 is coupled to the memory unit circuitry 1370, which includes data TLB circuitry 1372 coupled to a data cache circuitry 1374 coupled to a level 2 (L2) cache circuitry 1376. In one exemplary example, the memory access circuitry 1364 may include a load unit circuitry, a store address unit circuit, and a store data unit circuitry, each of which is coupled to the data TLB circuitry 1372 in the memory unit circuitry 1370. The instruction cache circuitry 1334 is further coupled to a level 2 (L2) cache circuitry 1376 in the memory unit circuitry 1370. In one example, the instruction cache 1334 and the data cache 1374 are combined into a single instruction and data cache (not shown) in L2 cache circuitry 1376, a level 3 (L3) cache circuitry (not shown), and/or main memory. The L2 cache circuitry 1376 is coupled to one or more other levels of cache and eventually to a main memory.

The core 1390 may support one or more instructions sets (e.g., the x86 instruction set architecture (with some extensions that have been added with newer versions); the MIPS instruction set architecture; the ARM instruction set architecture (with optional additional extensions such as NEON)), including the instruction(s) described herein. In one example, the core 1390 includes logic to support a packed data instruction set architecture extension (e.g., AVX1, AVX2), thereby allowing the operations used by many multimedia applications to be performed using packed data.

Exemplary Execution Unit(s) Circuitry

Figure 14:
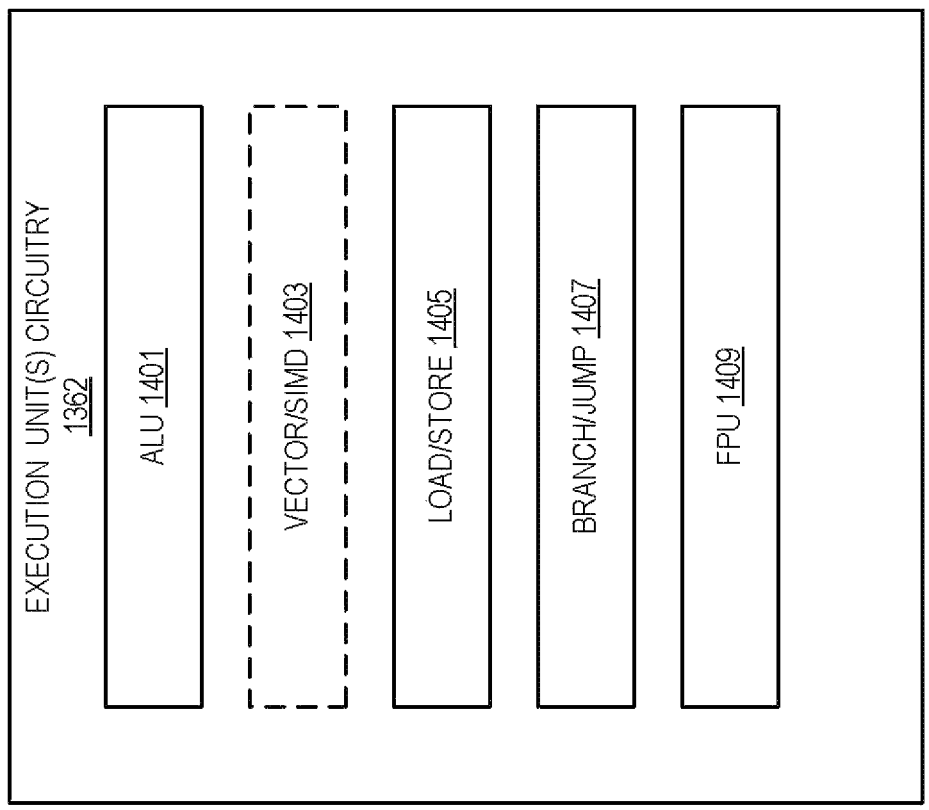
FIG. 14 illustrates examples of execution unit(s) circuitry.

FIG. 14 illustrates examples of execution unit(s) circuitry, such as execution unit(s) circuitry 1362 of FIG. 13(B). As illustrated, execution unit(s) circuitry 1362 may include one or more ALU circuits 1401, vector/single instruction multiple data (SIMD) circuits 1403, load/store circuits 1405, and/or branch/jump circuits 1407. ALU circuits 1401 perform integer arithmetic and/or Boolean operations. Vector/SIMD circuits 1403 perform vector/SIMD operations on packed data (such as SIMD/vector registers). Load/store circuits 1405 execute load and store instructions to load data from memory into registers or store from registers to memory. Load/store circuits 1405 may also generate addresses. Branch/jump circuits 1407 cause a branch or jump to a memory address depending on the instruction. Floating-point unit (FPU) circuits 1409 perform floating-point arithmetic. The width of the execution unit(s) circuitry 1362 varies depending upon the example and can range from 16-bit to 1,024-bit. In some examples, two or more smaller execution units are logically combined to form a larger execution unit (e.g., two 128-bit execution units are logically combined to form a 256-bit execution unit).

Exemplary Register Architecture

Figure 15:
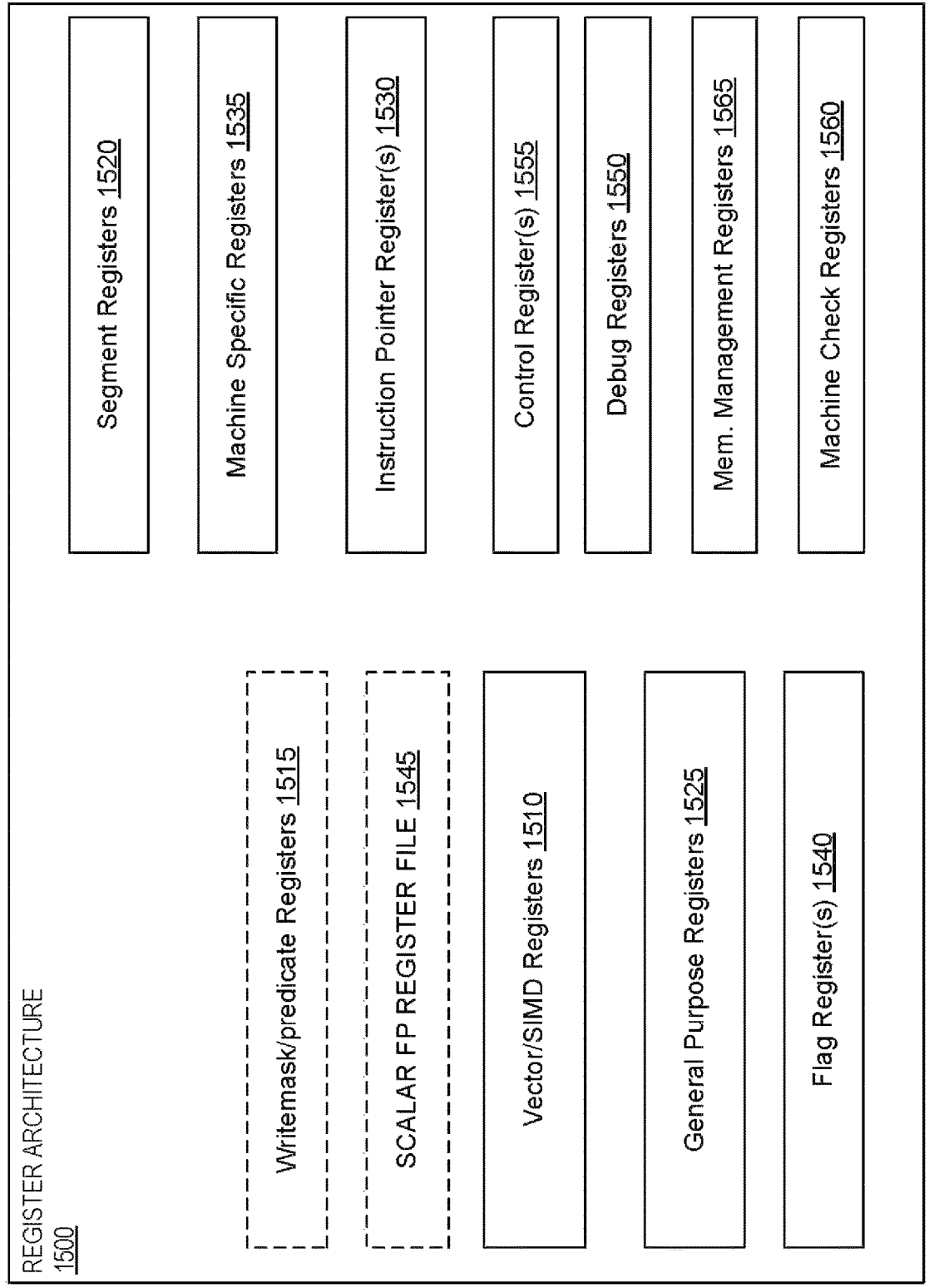
FIG. 15 is a block diagram of a register architecture according to some examples.

FIG. 15 is a block diagram of a register architecture 1500 according to some examples. As illustrated, there are vector/SIMD registers 1510 that vary from 128-bit to 1,024 bits width. In some examples, the vector/SIMD registers 1510 are physically 512-bits and, depending upon the mapping, only some of the lower bits are used. For example, in some examples, the vector/SIMD registers 1510 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1500 includes writemask/predicate registers 1515. For example, in some examples, there are 8 writemask/predicate registers (sometimes called k0 through k7) that are each 16-bit, 32-bit, 64-bit, or 128-bit in size. Writemask/predicate registers 1515 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1515 corresponds to a data element position of the destination. In other examples, the writemask/predicate registers 1515 are scalable and consists of a set number of enable bits for a given vector element (e.g., 8 enable bits per 64-bit vector element).

The register architecture 1500 includes a plurality of general-purpose registers 1525. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1500 includes scalar floating-point (FP) register 1545 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1540 (e.g., EFLAGS, RFLAGS, etc.) store status and control information for arithmetic, compare, and system operations. For example, the one or more flag registers 1540 may store condition code information such as carry, parity, auxiliary carry, zero, sign, and overflow. In some examples, the one or more flag registers 1540 are called program status and control registers.

Segment registers 1520 contain segment points for use in accessing memory. In some examples, these registers are referenced by the names CS, DS, SS, ES, FS, and GS.

Machine specific registers (MSRs) 1535 control and report on processor performance. Most MSRs 1535 handle system-related functions and are not accessible to an application program. Machine check registers 1560 consist of control, status, and error reporting MSRs that are used to detect and report on hardware errors.

One or more instruction pointer register(s) 1530 store an instruction pointer value. Control register(s) 1555 (e.g., CR0-CR4) determine the operating mode of a processor (e.g., processor 1170, 1180, 1138, 1115, and/or 1200) and the characteristics of a currently executing task. Debug registers 1550 control and allow for the monitoring of a processor or core's debugging operations.

Memory (mem) management registers 1565 specify the locations of data structures used in protected mode memory management. These registers may include a GDTR, IDRT, task register, and a LDTR register.

Alternative examples may use wider or narrower registers. Additionally, alternative examples may use more, less, or different register files and registers.

Instruction Set Architectures

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 16:
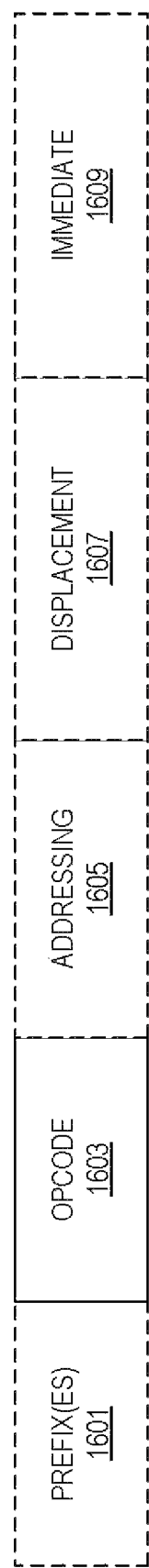
FIG. 16 illustrates examples of an instruction format.

FIG. 16 illustrates examples of an instruction format. As illustrated, an instruction may include multiple components including, but not limited to, one or more fields for: one or more prefixes 1601, an opcode 1603, addressing information 1605 (e.g., register identifiers, memory addressing information, etc.), a displacement value 1607, and/or an immediate value 1609. Note that some instructions utilize some or all of the fields of the format whereas others may only use the field for the opcode 1603. In some examples, the order illustrated is the order in which these fields are to be encoded, however, it should be appreciated that in other examples these fields may be encoded in a different order, combined, etc.

The prefix(es) field(s) 1601, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1603 is used to at least partially define the operation to be performed upon a decoding of the instruction. In some examples, a primary opcode encoded in the opcode field 1603 is one, two, or three bytes in length. In other examples, a primary opcode can be a different length. An additional 3-bit opcode field is sometimes encoded in another field.

Figure 17:
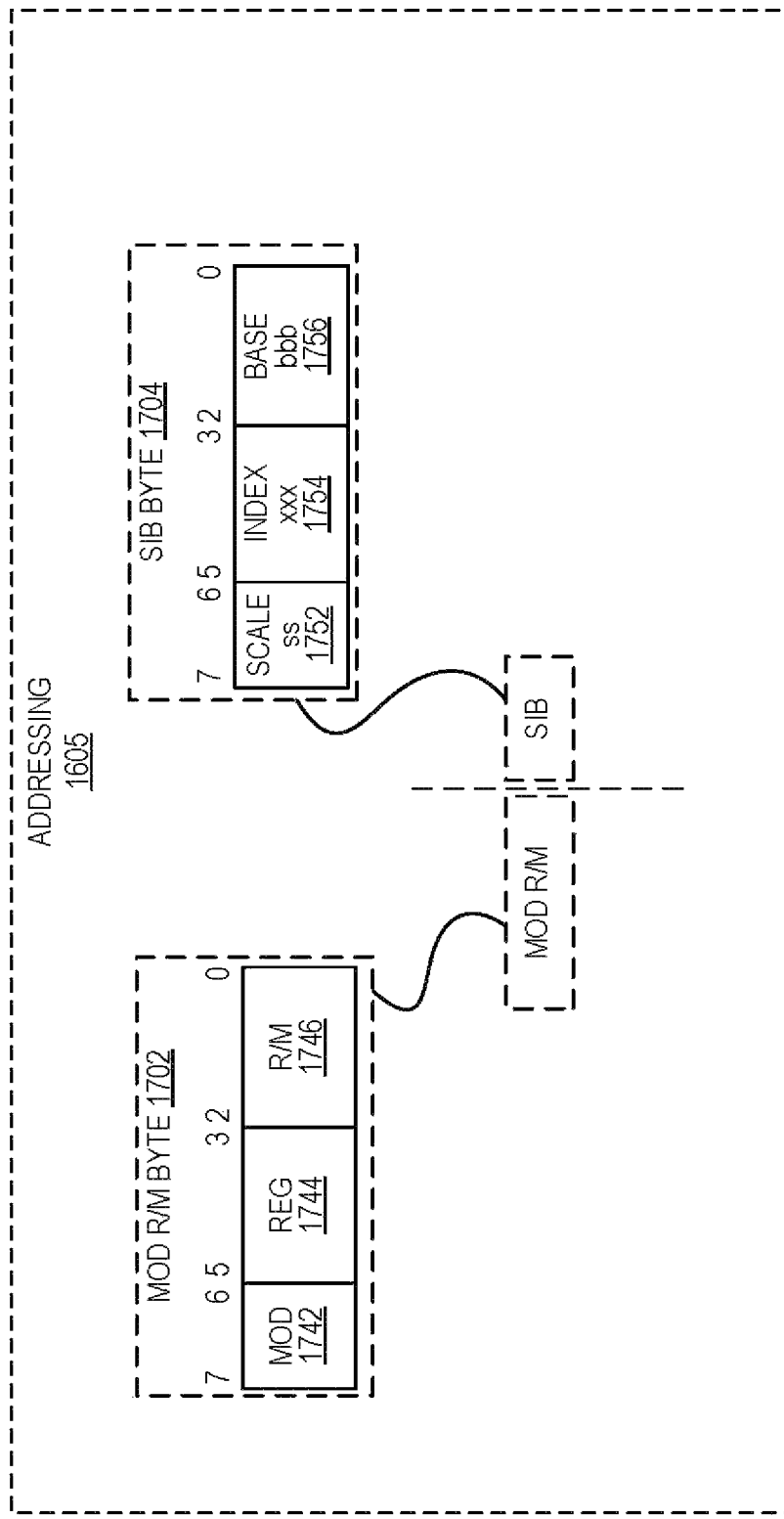
FIG. 17 illustrates examples of an addressing field.

The addressing field 1605 is used to address one or more operands of the instruction, such as a location in memory or one or more registers. FIG. 17 illustrates examples of the addressing field 1605. In this illustration, an optional ModR/M byte 1702 and an optional Scale, Index, Base (SIB) byte 1704 are shown. The ModR/M byte 1702 and the SIB byte 1704 are used to encode up to two operands of an instruction, each of which is a direct register or effective memory address. Note that each of these fields are optional in that not all instructions include one or more of these fields. The MOD R/M byte 1702 includes a MOD field 1742, a register (reg) field 1744, and R/M field 1746.

The content of the MOD field 1742 distinguishes between memory access and non-memory access modes. In some examples, when the MOD field 1742 has a value of b11, a register-direct addressing mode is utilized, and otherwise register-indirect addressing is used.

The register field 1744 may encode either the destination register operand or a source register operand, or may encode an opcode extension and not be used to encode any instruction operand. The content of register index field 1744, directly or through address generation, specifies the locations of a source or destination operand (either in a register or in memory). In some examples, the register field 1744 is supplemented with an additional bit from a prefix (e.g., prefix 1601) to allow for greater addressing.

The R/M field 1746 may be used to encode an instruction operand that references a memory address or may be used to encode either the destination register operand or a source register operand. Note the R/M field 1746 may be combined with the MOD field 1742 to dictate an addressing mode in some examples.

The SIB byte 1704 includes a scale field 1752, an index field 1754, and a base field 1756 to be used in the generation of an address. The scale field 1752 indicates scaling factor. The index field 1754 specifies an index register to use. In some examples, the index field 1754 is supplemented with an additional bit from a prefix (e.g., prefix 1601) to allow for greater addressing. The base field 1756 specifies a base register to use. In some examples, the base field 1756 is supplemented with an additional bit from a prefix (e.g., prefix 1601) to allow for greater addressing. In practice, the content of the scale field 1752 allows for the scaling of the content of the index field 1754 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 1607 provides this value. Additionally, in some examples, a displacement factor usage is encoded in the MOD field of the addressing field 1605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1607.

In some examples, an immediate field 1609 specifies an immediate value for the instruction. An immediate value may be encoded as a 1-byte value, a 2-byte value, a 4-byte value, etc.

FIG. 18 illustrates examples of a first prefix 1601(A). In some examples, the first prefix 1601(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1601(A) may specify up to three registers using 3-bit fields depending on the format: 1) using the reg field 1744 and the R/M field 1746 of the Mod R/M byte 1702; 2) using the Mod R/M byte 1702 with the SIB byte 1704 including using the reg field 1744 and the base field 1756 and index field 1754; or 3) using the register field of an opcode.

In the first prefix 1601(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1744 and MOD R/M R/M field 1746 alone can each only address 8 registers.

In the first prefix 1601(A), bit position 2 (R) may an extension of the MOD R/M reg field 1744 and may be used to modify the ModR/M reg field 1744 when that field encodes a general purpose register, a 64-bit packed data register (e.g., a SSE register), or a control or debug register. R is ignored when Mod R/M byte 1702 specifies other registers or defines an extended opcode.

Bit position 1 (X) X bit may modify the SIB byte index field 1754.

Bit position B (B) B may modify the base in the Mod R/M R/M field 1746 or the SIB byte base field 1756; or it may modify the opcode register field used for accessing general purpose registers (e.g., general purpose registers 1525).

FIGS. 19(A)-(D) illustrate examples of how the R, X, and B fields of the first prefix 1601(A) are used. FIG. 19(A) illustrates R and B from the first prefix 1601(A) being used to extend the reg field 1744 and R/M field 1746 of the MOD R/M byte 1702 when the SIB byte 17 04 is not used for memory addressing. FIG. 19(B) illustrates R and B from the first prefix 1601(A) being used to extend the reg field 1744 and R/M field 1746 of the MOD R/M byte 1702 when the SIB byte 17 04 is not used (register-register addressing). FIG. 19(C) illustrates R, X, and B from the first prefix 1601(A) being used to extend the reg field 1744 of the MOD R/M byte 1702 and the index field 1754 and base field 1756 when the SIB byte 17 04 being used for memory addressing. FIG. 19(D) illustrates B from the first prefix 1601(A) being used to extend the reg field 1744 of the MOD R/M byte 1702 when a register is encoded in the opcode 1603.

Figure 20A:
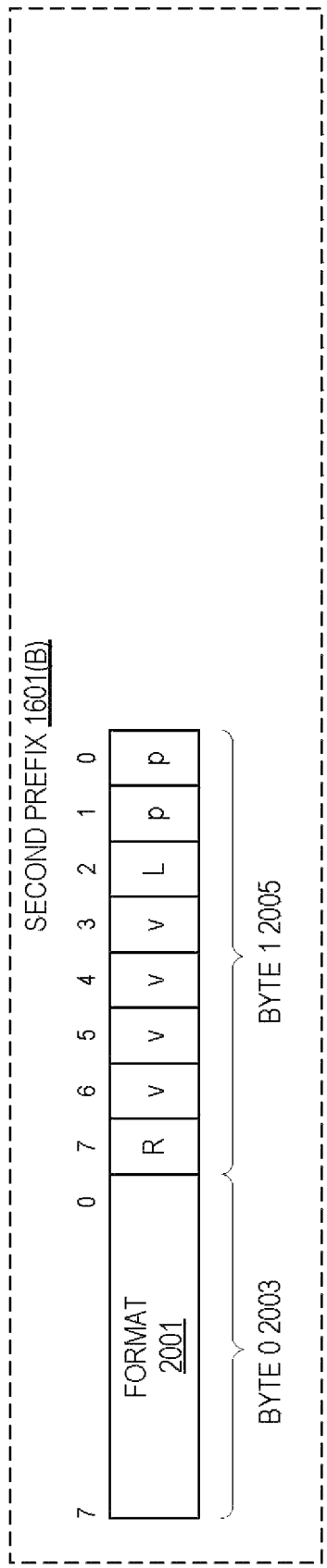
FIGS. 20(A)-(B) illustrate examples of a second prefix.
Figure 20B:
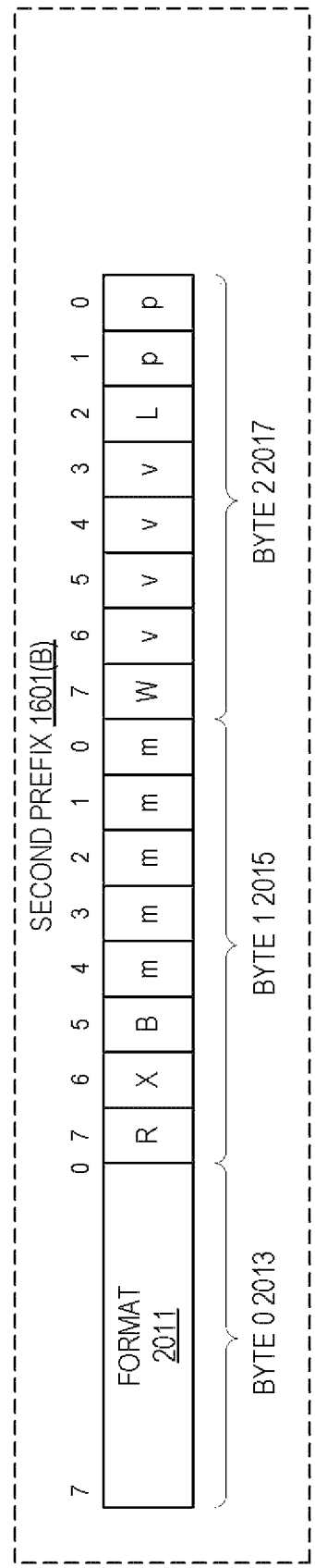

FIGS. 20(A)-(B) illustrate examples of a second prefix 1601(B). In some examples, the second prefix 1601(B) is an example of a VEX prefix. The second prefix 1601(B) encoding allows instructions to have more than two operands, and allows SIMD vector registers (e.g., vector/SIMD registers 1510) to be longer than 64-bits (e.g., 128-bit and 256-bit). The use of the second prefix 1601(B) provides for three-operand (or more) syntax. For example, previous two-operand instructions performed operations such as A=A+B, which overwrites a source operand. The use of the second prefix 1601(B) enables operands to perform nondestructive operations such as A=B+C.

In some examples, the second prefix 1601(B) comes in two forms—a two-byte form and a three-byte form. The two-byte second prefix 1601(B) is used mainly for 128-bit, scalar, and some 256-bit instructions; while the three-byte second prefix 1601(B) provides a compact replacement of the first prefix 1601(A) and 3-byte opcode instructions.

FIG. 20(A) illustrates examples of a two-byte form of the second prefix 1601(B). In one example, a format field 2001 (byte 0 2003) contains the value C5H. In one example, byte 1 2005 includes a "R" value in bit[7]. This value is the complement of the same value of the first prefix 1601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1746 to encode the instruction operand that references a memory address or encode either the destination register operand or a source register operand.

Instructions that use this prefix may use the Mod R/M reg field 1744 to encode either the destination register operand or a source register operand, be treated as an opcode extension and not used to encode any instruction operand.

For instruction syntax that support four operands, vvvv, the Mod R/M R/M field 1746 and the Mod R/M reg field 1744 encode three of the four operands. Bits[7:4] of the immediate 1609 are then used to encode the third source register operand.

FIG. 20(B) illustrates examples of a three-byte form of the second prefix 1601(B). in one example, a format field 2011 (byte 0 2013) contains the value C4H. Byte 1 2015 includes in bits[7:5] "R," "X," and "B" which are the complements of the same values of the first prefix 1601(A). Bits[4:0] of byte 1 2015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 2017 is used similar to W of the first prefix 1601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1746 to encode the instruction operand that references a memory address or encode either the destination register operand or a source register operand.

Instructions that use this prefix may use the Mod R/M reg field 1744 to encode either the destination register operand or a source register operand, be treated as an opcode extension and not used to encode any instruction operand.

For instruction syntax that support four operands, vvvv, the Mod R/M R/M field 1746, and the Mod R/M reg field 1744 encode three of the four operands. Bits[7:4] of the immediate 1609 are then used to encode the third source register operand.

Figure 21:
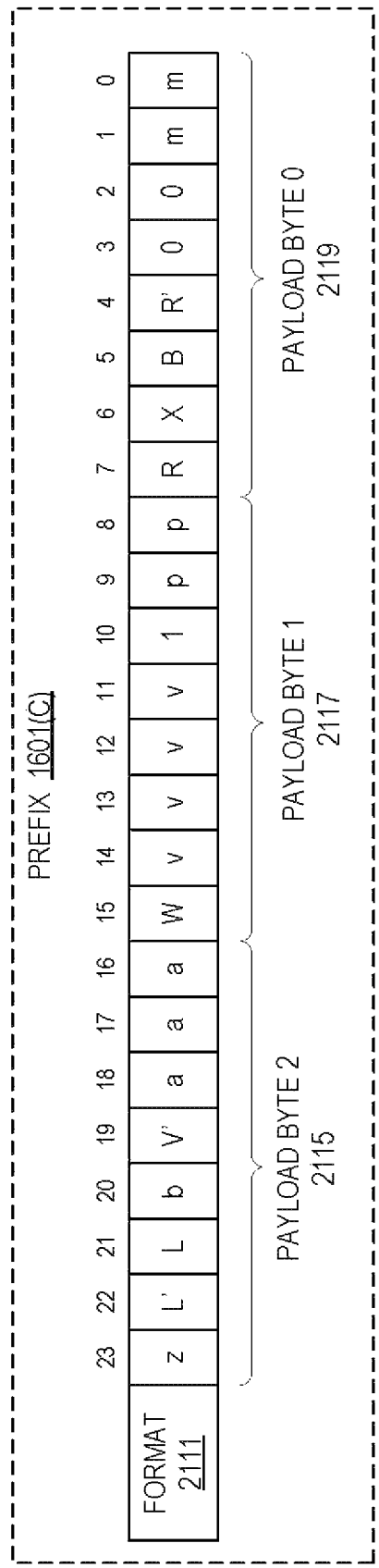
FIG. 21 illustrates examples of a third prefix.

FIG. 21 illustrates examples of a third prefix 1601(C). In some examples, the first prefix 1601(A) is an example of an EVEX prefix. The third prefix 1601(C) is a four-byte prefix.

The third prefix 1601(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 15) or predication utilize this prefix. Opmask register allow for conditional processing or selection control. Opmask instructions, whose source/destination operands are opmask registers and treat the content of an opmask register as a single value, are encoded using the second prefix 1601(B).

The third prefix 1601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1601(C) is a format field 2111 that has a value, in one example, of 62H. Subsequent bytes are referred to as payload bytes 2115-2119 and collectively form a 24-bit value of P[23:0] providing specific capability in the form of one or more fields (detailed herein).

In some examples, P[1:0] of payload byte 2119 are identical to the low two mmmmm bits. P[3:2] are reserved in some examples. Bit P[4] (R') allows access to the high 16 vector register set when combined with P[7] and the ModR/M reg field 1744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1744 and ModR/M R/M field 1746. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in Is complement form for certain vector shifts; or 3) not encode any operand, the field is reserved and should contain a certain value, such as 1111b.

P[15] is similar to W of the first prefix 1601(A) and second prefix 1611(B) and may serve as an opcode extension bit or operand size promotion.

P[18:16] specify the index of a register in the opmask (writemask) registers (e.g., writemask/predicate registers 1515). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Exemplary examples of encoding of registers in instructions using the third prefix 1601(C) are detailed in the following tables.

TABLE 1

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

|  | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

|  | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 22 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 22 shows a program in a high-level language 2202 may be compiled using a first ISA compiler 2204 to generate first ISA binary code 2206 that may be natively executed by a processor with at least one first instruction set architecture core 2216. The processor with at least one first ISA instruction set architecture core 2216 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 2204 represents a compiler that is operable to generate first ISA binary code 2206 (e.g., object code) that can, with or without additional linkage processing, be executed on the processor with at least one first ISA instruction set architecture core 2216. Similarly, FIG. 22 shows the program in the high-level language 2202 may be compiled using an alternative instruction set architecture compiler 2208 to generate alternative instruction set architecture binary code 2210 that may be natively executed by a processor without a first ISA instruction set architecture core 2214. The instruction converter 2212 is used to convert the first ISA binary code 2206 into code that may be natively executed by the processor without a first ISA instruction set architecture core 2214. This converted code is not likely to be the same as the alternative instruction set architecture binary code 2210 because an instruction converter capable of this is difficult to make; however, the converted code will accomplish the general operation and be made up of instructions from the alternative instruction set architecture. Thus, the instruction converter 2212 represents software, firmware, hardware, or a combination thereof that, through emulation, simulation or any other process, allows a processor or other electronic device that does not have a first ISA instruction set architecture processor or core to execute the first ISA binary code 2206.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMS, EEPROMs, magnetic or optical cards, or any type of media suitable for storing electronic instructions and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

Additional Notes and Examples

Example 1 is an apparatus including decoder circuitry to decode a conditional rotate and exclusive-OR (XOR) operation instruction, the conditional rotate and XOR instruction to include a field for an opcode, a first operand, a second operand, a third operand, and a fourth operand, the opcode to indicate execution circuitry is to perform a conditional rotate and XOR operation; and execution circuitry to execute the conditional rotate and XOR instruction according to the opcode to perform the conditional rotate and XOR operation to: left rotate the third operand by a first rotation value to generate a first result, execute the first operand XOR the second operand XOR the first result to generate a second result, left rotate the second result by a second rotation value to generate a third result, and store the third result in the first operand.

In Example 2, the subject matter of Example 1 may optionally include wherein the first operand, the second operand, and the third operand are selected consecutive elements of a Keccak state variable array stored in at least one of a memory and a set of registers. In Example 3, the subject matter of Example 1 may optionally include wherein the first rotation value is a first set of bits of the fourth operand and the second rotation value is a second set of bits of the fourth operand. In Example 4, the subject matter of Example 3 may optionally include wherein the first set of bits comprises a most significant bit of the fourth operand, and the second set of bits comprises a plurality of least significant bits of the fourth operand. In Example 5, the subject matter of Example 1 may optionally include wherein the conditional rotate and XOR instruction is translated from a first instruction set architecture to a second instruction set architecture before decoding.

Example 6 is a method including fetching a conditional rotate and XOR instruction having fields for an opcode, the opcode indicating execution circuitry is to perform a conditional rotate and XOR operation, and fields for a first operand, a second operand, a third operand, and a fourth operand; decoding the instruction according to the opcode; scheduling execution of the instruction; and executing the decoded instruction to left rotate the third operand by a first rotation value to generate a first result, execute the first operand XOR the second operand XOR the first result to generate a second result, left rotate the second result by a second rotation value to generate a third result, and store the third result in the first operand.

In Example 7, the subject matter of Example 6 may optionally include wherein the first operand, the second operand, and the third operand are selected consecutive elements of a Keccak state variable array stored in at least one of a memory and a set of registers. In Example 8, the subject matter of Example 6 may optionally include wherein the first rotation value is a first set of bits of the fourth operand and the second rotation value is a second set of bits of the fourth operand. In Example 9, the subject matter of Example 8 may optionally include wherein the first set of bits comprises a most significant bit of the fourth operand, and the second set of bits comprises a plurality of least significant bits of the fourth operand. In Example 10, the subject matter of Example 6 may optionally include translating the conditional rotate and XOR instruction from a first instruction set architecture to a second instruction set architecture before decoding.

Example 11 is an apparatus including decoder circuitry to decode a triple input bitwise logical operations instruction, the triple input bitwise logical operations instruction to include a field for an opcode, a first operand, a second operand, and a third operand, the opcode to indicate execution circuitry is to perform triple input bitwise logical operations; and execution circuitry to execute the triple input bitwise logical operations instruction according to the opcode to perform the triple input bitwise logical operations to execute the second operand AND the third operand to generate a first result, execute the first operand XOR the first result to generate a second result, execute the second result XOR the third operand to generate a third result, and store the third result in the first operand.

In Example 12, the subject matter of Example 11 may optionally include wherein the first operand, the second operand, and the third operand are selected consecutive elements of a Keccak state variable array stored in at least one of a memory and a set of registers. In Example 13, the subject matter of Example 11 may optionally include wherein the triple input bitwise logical operations instruction is translated from a first instruction set architecture to a second instruction set architecture before decoding. In Example 14, the subject matter of Example 11 may optionally include the execution circuitry to execute the triple input bitwise logical operations instruction according to the opcode to perform the triple input bitwise logical operations to execute NOT the second operand AND the third operand XOR the first operand to generate a result and store the result in the first operand.

Example 15 is a method including fetching a triple input bitwise logical operations instruction having fields for an opcode, the opcode indicating execution circuitry is to perform triple input bitwise logical operations, and fields for a first operand, a second operand, and a third operand; decoding the instruction according to the opcode; scheduling execution of the instruction; and executing the decoded instruction to execute the second operand AND the third operand to generate a first result, execute the first operand XOR the first result to generate a second result, execute the second result XOR the third operand to generate a third result, and store the third result in the first operand.

In Example 16, the subject matter of Example 15 may optionally include wherein the first operand, the second operand, and the third operand are selected consecutive elements of a Keccak state variable array stored in at least one of a memory and a set of registers. In Example 17, the subject matter of Example 15 may optionally include translating the triple input bitwise logical operations instruction from a first instruction set architecture to a second instruction set architecture before decoding. In Example 18, the subject matter of Example 15 may optionally include executing the decoded instruction to execute NOT the second operand AND the third operand XOR the first operand to generate a result and store the result in the first operand.

Example 19 is an apparatus operative to perform the method of any one of Examples 6-10 and 15-18. Example 20 is an apparatus that includes means for performing the method of any one of Examples 6-10 and 15-18. Example 21 is an apparatus that includes any combination of modules and/or units and/or logic and/or circuitry and/or means operative to perform the method of any one of Examples 6-10 and 15-18. Example 22 is an optionally non-transitory and/or tangible machine-readable medium, which optionally stores or otherwise provides instructions that if and/or when executed by a computer system or other machine are operative to cause the machine to perform the method of any one of Examples 6-10 and 15-18.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
decoder circuitry to decode a conditional rotate and exclusive-OR (XOR) operation instruction, the conditional rotate and XOR instruction to include a field for an opcode, a first operand, a second operand, a third operand, and a fourth operand, the opcode to indicate execution circuitry is to perform a conditional rotate and XOR operation; and
execution circuitry to execute the conditional rotate and XOR instruction according to the opcode to perform the conditional rotate and XOR operation to:
left rotate the third operand by a first rotation value to generate a first result, execute the first operand XOR the second operand XOR the first result to generate a second result, left rotate the second result by a second rotation value to generate a third result, and store the third result in the first operand.

2. The apparatus of claim 1, wherein the first operand, the second operand, and the third operand are selected consecutive elements of a Keccak state variable array stored in at least one of a memory and a set of registers.

3. The apparatus of claim 1, wherein the first rotation value is a first set of bits of the fourth operand and the second rotation value is a second set of bits of the fourth operand.

4. The apparatus of claim 3, wherein the first set of bits comprises a most significant bit of the fourth operand, and the second set of bits comprises a plurality of least significant bits of the fourth operand.

5. The apparatus of claim 1, wherein the conditional rotate and XOR instruction is translated from a first instruction set architecture to a second instruction set architecture before decoding.

6. A method, comprising:
fetching a conditional rotate and XOR instruction having fields for an opcode, the opcode indicating execution circuitry is to perform a conditional rotate and XOR operation, and fields for a first operand, a second operand, a third operand, and a fourth operand;
decoding the instruction according to the opcode;
scheduling execution of the instruction; and
executing the decoded instruction to:
left rotate the third operand by a first rotation value to generate a first result, execute the first operand XOR the second operand XOR the first result to generate a second result, left rotate the second result by a second rotation value to generate a third result, and store the third result in the first operand.

7. The method of claim 6, wherein the first operand, the second operand, and the third operand are selected consecutive elements of a Keccak state variable array stored in at least one of a memory and a set of registers.

8. The method of claim 6, wherein the first rotation value is a first set of bits of the fourth operand and the second rotation value is a second set of bits of the fourth operand.

9. The method of claim 8, wherein the first set of bits comprises a most significant bit of the fourth operand, and the second set of bits comprises a plurality of least significant bits of the fourth operand.

10. The method of claim 6, comprising translating the conditional rotate and XOR instruction from a first instruction set architecture to a second instruction set architecture before decoding.

11. An apparatus comprising:
decoder circuitry to decode a triple input bitwise logical operations instruction, the triple input bitwise logical operations instruction to include a field for an opcode, a first operand, a second operand, and a third operand, the opcode to indicate execution circuitry is to perform triple input bitwise logical operations; and
execution circuitry to execute the triple input bitwise logical operations instruction according to the opcode to perform the triple input bitwise logical operations to:
execute the second operand AND the third operand to generate a first result, execute the first operand XOR the first result XOR the third operand to generate a second result, and store the second result in the first operand.

12. The apparatus of claim 11, wherein the first operand, the second operand, and the third operand are selected consecutive elements of a Keccak state variable array stored in at least one of a memory and a set of registers.

13. The apparatus of claim 11, wherein the triple input bitwise logical operations instruction is translated from a first instruction set architecture to a second instruction set architecture before decoding.

14. The apparatus of claim 11, comprising the execution circuitry to execute the triple input bitwise logical operations instruction according to the opcode to perform the triple input bitwise logical operations to:
execute NOT the second operand AND the third operand XOR the first operand to generate a result and store the result in the first operand.

* * * * *